US009083238B2

(12) United States Patent
Yashiki

(10) Patent No.: US 9,083,238 B2
(45) Date of Patent: Jul. 14, 2015

(54) CONTROL CIRCUIT, POWER SUPPLY DEVICE, AND METHOD OF CONTROLLING POWER SUPPLY

(75) Inventor: Makoto Yashiki, Kasugai (JP)

(73) Assignee: SOCIONEXT INC., Yokohoma (JP)

( * ) Notice: Subject to any disclaimer, the term of this patent is extended or adjusted under 35 U.S.C. 154(b) by 328 days.

(21) Appl. No.: 13/593,072

(22) Filed: Aug. 23, 2012

(65) Prior Publication Data
US 2013/0049725 A1 Feb. 28, 2013

(30) Foreign Application Priority Data
Aug. 24, 2011 (JP) ................................ 2011-182802

(51) Int. Cl.
*H02M 3/156* (2006.01)

(52) U.S. Cl.
CPC .................................. *H02M 3/1563* (2013.01)

(58) Field of Classification Search
USPC .................................. 323/222, 223, 265, 271
See application file for complete search history.

(56) References Cited

U.S. PATENT DOCUMENTS

| 6,064,187 | A | 5/2000 | Redl et al. | |
| 7,788,977 | B2* | 9/2010 | Nagata | 73/504.12 |
| 8,138,739 | B1* | 3/2012 | Eirea et al. | 323/286 |
| 2002/0057125 | A1 | 5/2002 | Demizu | |
| 2002/0093321 | A1 | 7/2002 | Wrathall | |
| 2005/0127881 | A1 | 6/2005 | Sase et al. | |
| 2008/0290811 | A1* | 11/2008 | Yoshida | 315/225 |
| 2009/0102444 | A1* | 4/2009 | Nonaka | 323/282 |
| 2010/0181977 | A1* | 7/2010 | Sohma | 323/282 |
| 2011/0273156 | A1* | 11/2011 | Miyamae | 323/288 |
| 2012/0014791 | A1* | 1/2012 | Hine et al. | 416/1 |
| 2012/0306465 | A1* | 12/2012 | Suga et al. | 323/282 |

FOREIGN PATENT DOCUMENTS

| CN | 101064470 A | 10/2007 |
| JP | H07-222437 A | 8/1995 |
| JP | 2002-278631 A | 9/2002 |
| JP | 2005-184870 A | 7/2005 |
| JP | 2010-051073 A | 3/2010 |

OTHER PUBLICATIONS

Chinese Office Action dated May 27, 2014 issued in Chinese Patent Application No. 201210308086.5.
Japanese Office Action mailed Mar. 3, 2015 for corresponding Japanese Patent Application No. 2011-182802.

* cited by examiner

*Primary Examiner* — Jue Zhang
*Assistant Examiner* — Lakaisha Jackson
(74) *Attorney, Agent, or Firm* — Arent Fox LLP

(57) ABSTRACT

A control circuit of a power supply that generates an output voltage from an input voltage includes a gain adjustment circuit that adjusts a gain of an alternating-current component of the output voltage. An addition circuit adds an output signal of the gain adjustment circuit to a first feedback voltage, which is in accordance with the output voltage, to generate a second feedback voltage. A voltage generation circuit generates a comparison reference voltage that changes at a given rate with respect to a first reference voltage that is set according to a target value of the output voltage. A switch control circuit controls the output voltage by switching a switch circuit, to which the input voltage is supplied, at a timing according to a result of a comparison of the second feedback voltage with the comparison reference voltage.

15 Claims, 14 Drawing Sheets

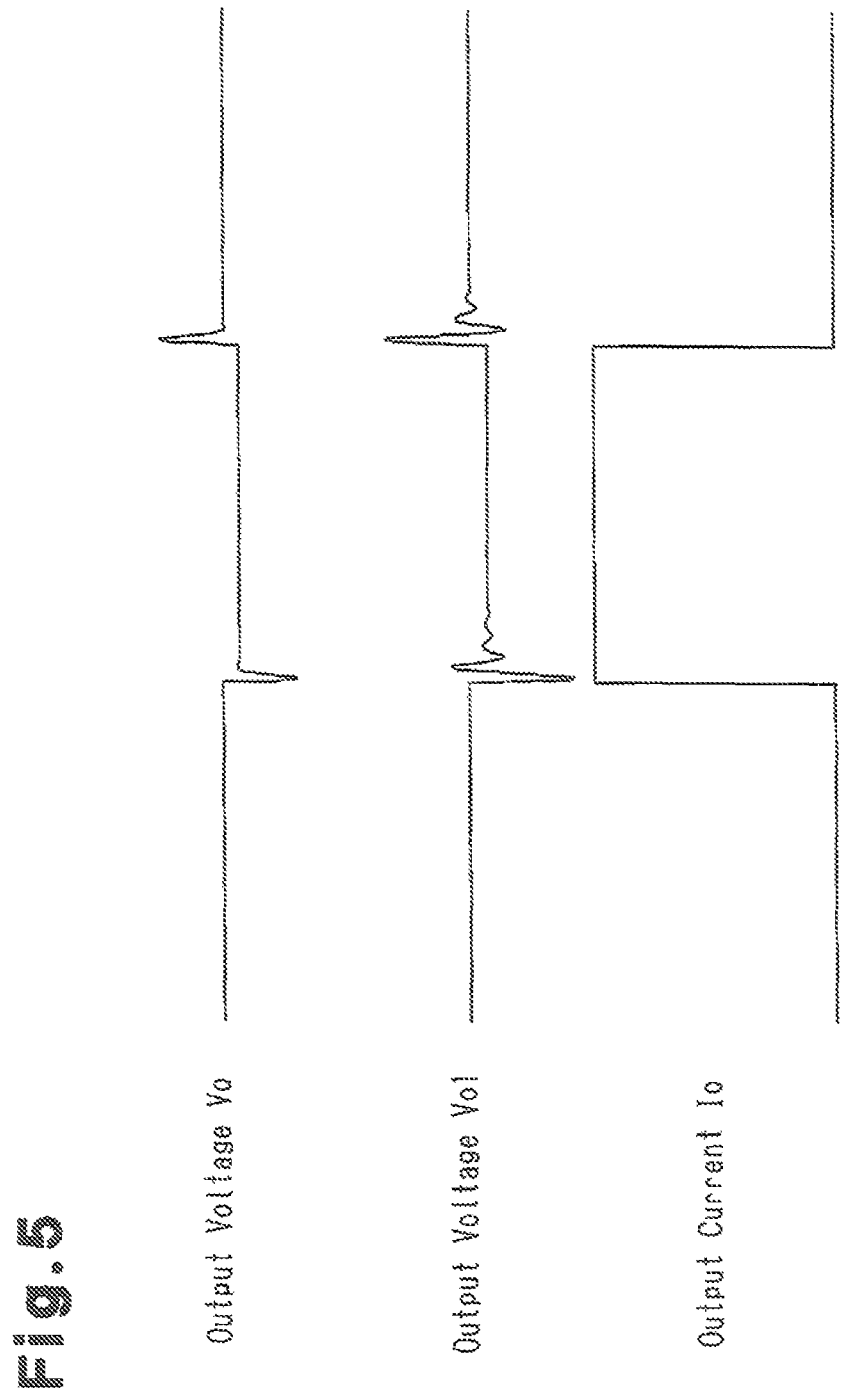

CONTROL CIRCUIT, POWER SUPPLY DEVICE, AND METHOD OF CONTROLLING POWER SUPPLY

CROSS-REFERENCE TO RELATED APPLICATIONS

This application is based upon and claims the benefit of priority from prior Japanese Patent Application No. 2011-182802, filed on Aug. 24, 2011, the entire contents of which are incorporated herein by reference.

FIELD

This disclosure relates to a control circuit, a power supply device, and a method of controlling a power supply.

BACKGROUND

In an electronic device, a switching power supply is used for supplying power to a load. For example, a DC-DC converter that converts a direct-current voltage into a different direct-current voltage is used. Japanese Laid-Open Patent Publication No. 2010-051073 describes a comparator-type DC-DC converter that may respond at a high speed to a sudden change in a load.

FIG. 14 illustrates an example of a comparator-type DC-DC converter 4 according to a related alt. The DC-DC converter 4 includes a converter unit 5 and a control circuit 6. The converter unit 5 includes transistors T11 and T12, a coil L11, and a capacitor C11.

A comparator 80 provided in the control circuit 6 receives a feedback voltage VFB1, which is generated according to an output voltage Vo1, and a reference voltage VR11. In FIG. 14, the feedback voltage VFB1 is generated by adding an alternating-current component of the output voltage Vo1 supplied through a capacitor C12 coupled in parallel to a resistor R11, to a divided voltage Vn obtained by dividing the output voltage Vo1 by resistors R11 and R12. The comparator 80 compares the feedback voltage VFB1 with the reference voltage VR11, and generates an signal S11 having a level according to a result of the comparison. The output signal S11 is supplied to a set terminal S of an RS-flip-flop (RS-FF circuit) 81. An oscillator 82 generates a dock signal CLK of a constant frequency, and supplies the dock signal CLK to a reset terminal R of the RS-FF circuit 81.

The RS-FF circuit 81 shifts to a reset state in response to the clock signal CLK of an H level and generates an output signal S12 of an L level. In this case, a drive circuit 83 generates control signals DH and DL of an H level, and deactivates the transistor T11 and activates the transistor T12. At this time, a switch circuit SW11 is turned off by the output signal S12 of the L level, and a capacitor C13 is charged according to a current I11 supplied from a current source 84. Therefore, the reference voltage VR11 increases at a fixed slope (I11/C13) from a reference voltage VR0.

When the reference voltage VR11 becomes higher than the feedback voltage VFB1, the comparator 80 generates the output signal S11, in response to the output signal S11 of an H level, the RS-FF circuit 81 shifts to a set state, and generates the output signal S12 of an H level. In this case, the drive circuit 83 generates the control signals DH and DL of an L level, and activates the transistor T11 and deactivates the transistor T12.

In this manner, in the comparator-type DC-DC converter 4, the comparator 80 compares the feedback voltage VFB1 according to the output voltage Vo1 with the reference voltage VR11. Then, the transistor T11 is switched according to a result of the comparison. Therefore, the comparator-type DC-DC converter 4 may respond at a high speed to a sudden change in a load.

In recent years, in DC-DC converters, because of low cost and other reasons, a ceramic capacitor of a low equivalent series resistance ESR is employed in many cases for the capacitor C11 in the converter unit 5. However, when a value of the equivalent series resistance ESR of the ceramic capacitor is too low, phase margin may not be sufficiently secured. Therefore, in a high-frequency operation when a load suddenly changes, ringing sometimes occurs in the output voltage Vo1.

SUMMARY

According to one aspect, a control circuit of a power supply configured to generate an output voltage from an input voltage includes a gain adjustment circuit configured to adjust a gain of an alternating-current component of the output voltage. An addition circuit adds an output signal of the gain adjustment circuit to a first feedback voltage, which is in accordance with the output voltage, to generate a second feedback voltage. A voltage generation circuit generates a comparison reference voltage that changes at a given rate with respect to a first reference voltage that is set in accordance with a target value of the output voltage. A switch control circuit controls the output voltage by switching a switch circuit, which is supplied the input voltage, at a timing according to a result of a comparison of the second feedback voltage with the comparison reference voltage.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

The embodiment, together with objects and advantages thereof, may best be understood by reference to the following description of the presently preferred embodiments together with the accompanying drawings in which:

FIG. 5 is a waveform diagram illustrating a result of a simulation when a load suddenly changes in the DC-DC converter of FIG. 1;

DESCRIPTION OF TH EMBODIMENTS

One embodiment will now be described below with reference to FIGS. 1 to 6.

Figure 1:
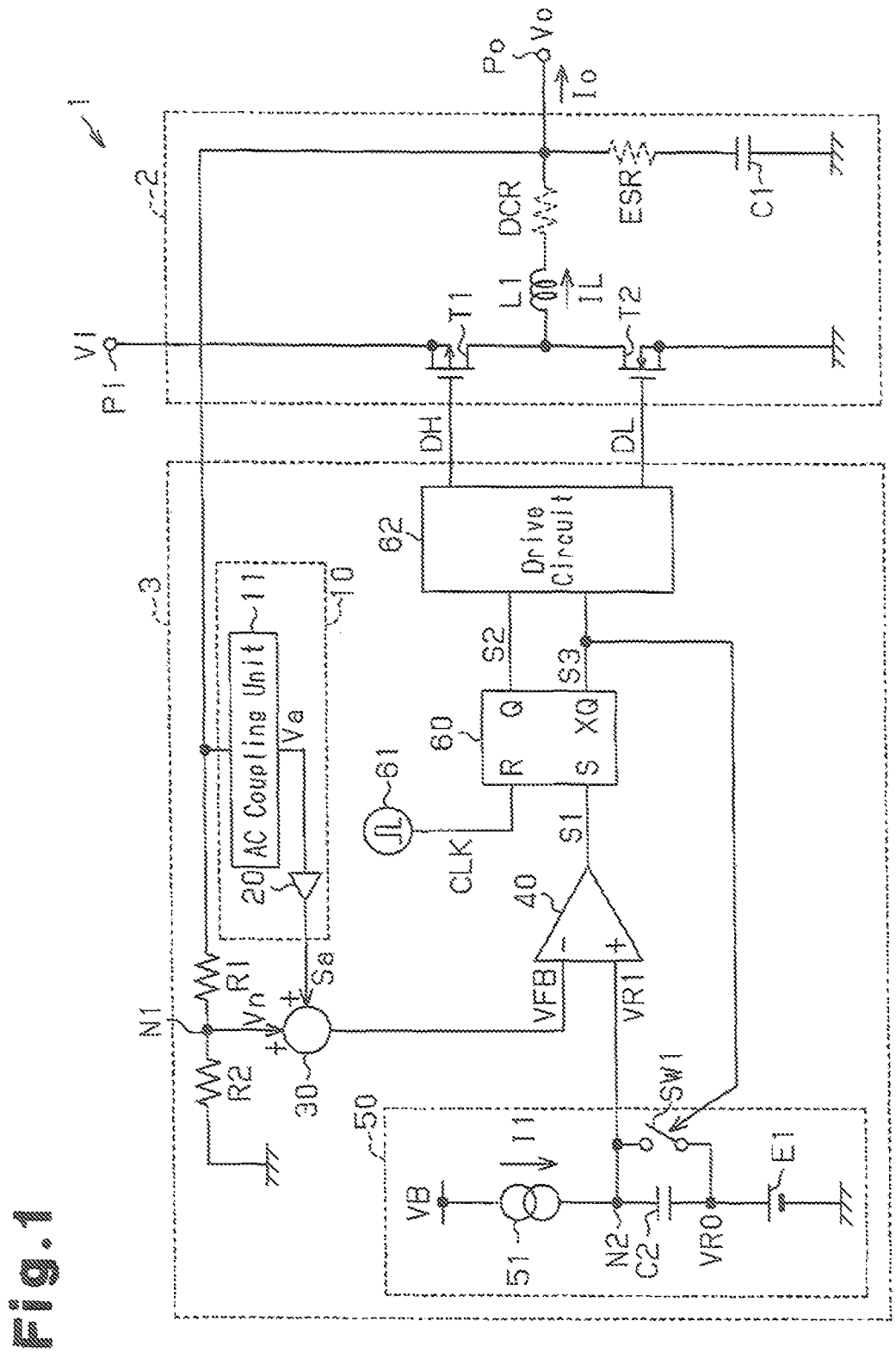
FIG. 1 is a block circuit diagram schematically illustrating a DC-DC converter according to one embodiment.
Figure 2:
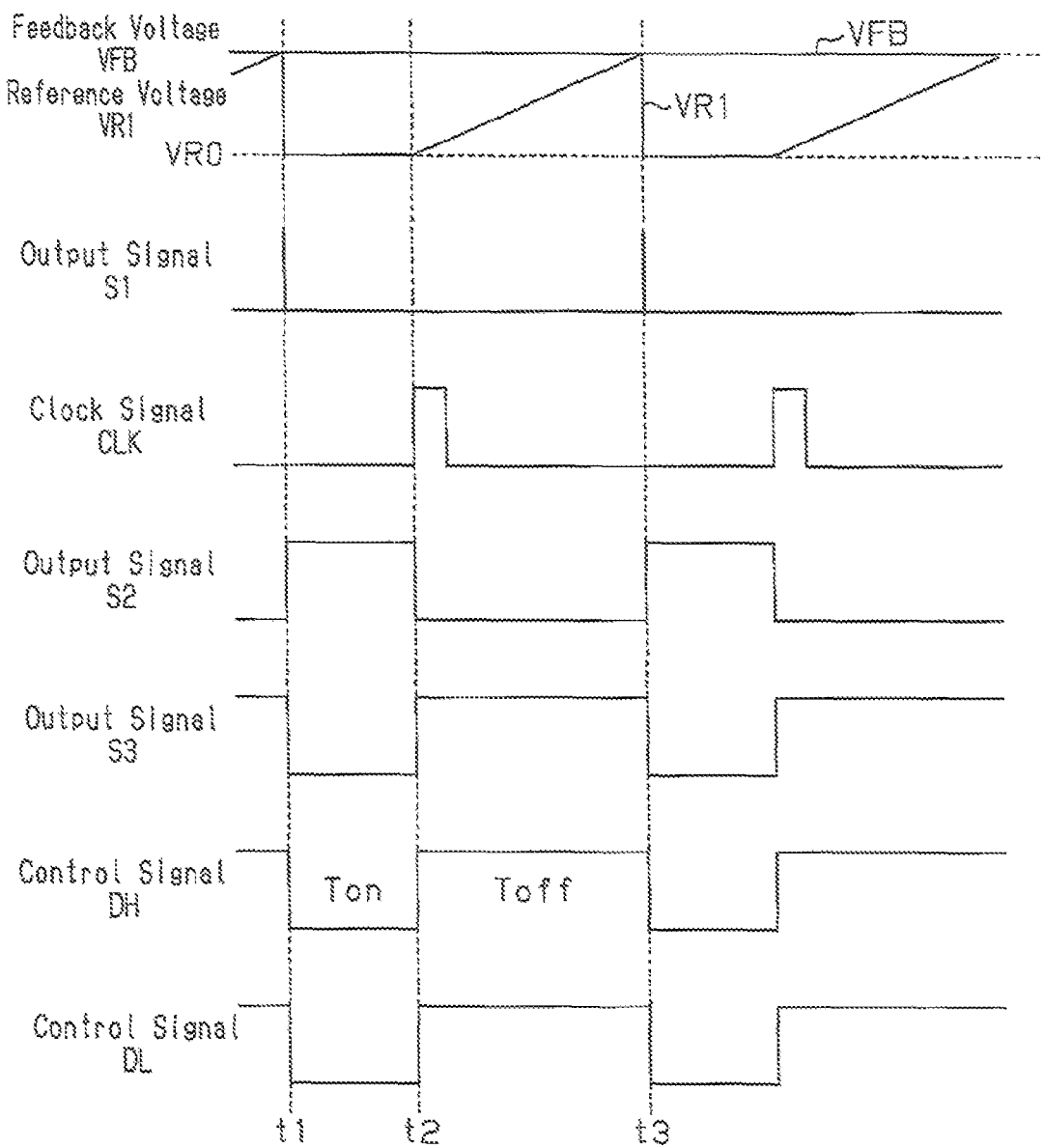
FIG. 2 is a timing chart illustrating an operation of a control circuit provided in the DC-DC converter of FIG. 1.

As illustrated in FIG. 1, a DC-DC converter 1 it a converter unit 2, and a control circuit 3 that controls the converter unit 2. The converter unit 2 generates an output voltage Vo that is lower than an input voltage Vi.

An example of an internal structure of the converter unit 2 will now be described.

The input voltage Vi is supplied to an input terminal Pi Transistors T1 and T2 are coupled in series between the input terminal Pi and a power source line (a ground, in this case) that has a lower potential than that of the input voltage Vi. In FIG. 1, the transistor T1 may be also called a main transistor, and the transistor T2 may be also called a synchronization transistor. The transistor T1 is a P-channel MOS transistor, and the transistor T2 is an N-channel MOS transistor.

The transistor T1 has a first terminal (a source) coupled to the input terminal Pi, a second terminal (a drain), and a control terminal (a gate). The transistor T2 has a first terminal (a drain) coupled to the second terminal of the transistor T1, a second terminal (a source) coupled to the ground, and a control terminal (a gate).

A control signal DH is supplied from the control circuit 3 to the control terminal (the gate) of the transistor T1. A control signal DL is supplied from the control circuit 3 to the control terminal (the gate) of the transistor T2. The transistors T1 and T2 are activated and deactivated complementarily in response to the control signals DH and DL, respectively.

A connection node between the transistors T1 and T2 is coupled to a first terminal of a coil L1. A second terminal of the coil L1 is coupled to an output terminal Po that outputs the output voltage Vo. Therefore, the transistor T1 and the coil L1 are coupled in series between the input terminal Pi and the output terminal Po. The second terminal of the coil L1 is coupled to a first terminal of a capacitor C1. A second terminal of the capacitor C1 is coupled to the ground. The capacitor C1 is a smoothing capacitor that is included in a smoothing circuit which smoothes the output voltage Vo. A resistor that is coupled in series to the coil L1 is an equivalent direct current resistor DCR which is a resistor component included in the coil L1. A resistor that is coupled in series to the capacitor C1 is an equivalent series resistance ESR which is a resistor component included in the capacitor C1.

In the converter unit 2, when the transistor T1 is activated and the transistor T2 is deactivated, a coil current IL according to a potential difference between the input voltage Vi and the output voltage Vo flows through the coil L1. Consequently, energy is accumulated in the coil L1. When the transistor T1 is deactivated and the transistor T2 is activated, the coil L1 discharges the accumulated energy. This flows an induction current (a coil current IL) through the coil L1. Based on this operation, the output voltage Vo lower than the input voltage Vi is generated. Then, the output voltage Vo is supplied to a load (not illustrated) coupled to the output terminal Po. An output current to is also supplied to the load.

The control circuit 3 adjusts pulse widths of the control signals DH and DL based on the output voltage Vo that is fed back from the converter unit 2. An example of an internal structure of the control circuit 3 will now be described.

The control circuit 3 includes resistors R1 and R2, a gain adjustment circuit 10, an addition circuit 30, a comparator 40, a reference voltage generation circuit 50, an RS-flip-flop (RS-FF circuit) 60, an oscillator 61, and a drive circuit 62.

The output terminal Po of the converter unit 2 is coupled to the ground via the resistors R1 and R2. A node N1 between the resistor R1 and the resistor R2 is coupled to the addition circuit 30. The resistors R1 and R2 generate a divided voltage Vn by dividing the output voltage Vo. The divided voltage Vn has a value depending on a resistance ratio between the resistors R1 and R2 and a potential difference between the output voltage Vo and a ground potential. Thus, the resistors R1 and R2 generate the divided voltage Vn that is proportional to the output voltage Vo. The resistors R1 and R2 are examples of a voltage division circuit.

The gain adjustment circuit 10 is arranged in a path separate from a path in which the output voltage Vo is fed back to the comparator 40 through the voltage division circuit (the resistors R1 and R2). The gain adjustment circuit 10 adjusts a gain of an AC component (an alternating-current component) of the output voltage Vo and supplies an output signal Sa, which serves, as a gain-adjusted signal, to the addition circuit 30. The gain adjustment circuit 10 includes an AC coupling unit 11, which extracts the AC component of the output voltage Vo as an AC signal Va, and a gain adjustment unit 20, which generates the output signal Sa by amplifying the AC signal Va by a given gain.

The addition circuit 30 adds the output signal Sa of the gain adjustment circuit 10 to the divided voltage Vn. In the present embodiment, the addition circuit 30 generates a feedback voltage VFB by adding the output signal Sa to the divided voltage Vn. The feedback voltage VFB is supplied to an inverting input terminal of the comparator 40. In this manner, the addition circuit 30 generates the feedback voltage VFB by adding the output signal Sa of the gain adjustment circuit 10, which is obtained by amplifying the alternating-current component (a variation component) of the output voltage Vo by the given gain, to the divided voltage Vn of the output voltage Vo.

The reference voltage generation circuit 50 generates a reference voltage VR1. The reference voltage VR1 is supplied to a non-inverting input terminal of the comparator 40. The reference voltage generation circuit 50 includes a constant current source 51, a capacitor C2, a switch circuit SW1, and a reference power supply E1.

The constant current source 51 generates a constant current I1. The constant current source 51 has a first terminal coupled to a power source line to which a bias voltage VB is supplied, and a second terminal coupled to a first terminal (a node N2)

of the capacitor C2. For example, the bias voltage VB is a voltage generated by a power supply circuit not illustrated, or the input voltage Vi. A second terminal of the capacitor C2 is coupled to a positive terminal of the reference power supply E1. A negative terminal of the reference power supply E1 is coupled to the ground. The reference power supply E1 generates a reference voltage VR0 that has a voltage value set according to a target value of the output voltage Vo. The switch circuit SW1 is coupled parallel to the capacitor C2. The switch circuit SW1 is turned on and off in response to an output signal S3 supplied from the RS-FF circuit 60. The switch circuit SW1 is a P-channel MOS transistor, for example.

The first terminal (the node N2) of the capacitor C2 is coupled to the non-inverting input terminal of the comparator 40. Therefore, a potential of the first terminal of the capacitor C2 is supplied to the non-inverting input terminal of the comparator 40 as the reference voltage VR1.

In the reference voltage generation circuit 50, when the switch circuit SW1 is turned on, the first and second terminals of the capacitor C2 are short-circuited, and a potential of the first terminal of the capacitor C2 becomes equal to the reference voltage VR0. In this case, the reference voltage VR0 is supplied to the non-inverting input terminal of the comparator 40 as the reference voltage VR1. On the other hand, when the switch circuit SW1 is turned off, a potential difference between the first and second terminals of the capacitor C2 increases according to the current I1 supplied from the constant current source 51. The potential difference changes proportional to the current I1. At this time, a potential of the second terminal of the capacitor C2 is equal to the reference voltage VR0. Therefore, the potential of the first terminal of the capacitor C2 corresponds to a potential obtained by adding the potential difference between the first and second terminals of the capacitor C2 to the reference voltage VR0. The potential of the first terminal of the capacitor C2 is then supplied to the non-inverting input terminal of the comparator 40 as the reference voltage VR1.

In this manner, during a period when the switch circuit SW1 is turned on, the reference voltage VR1 is generated as the fixed reference voltage VR0. On the other hand, during a period when the switch circuit SW1 is turned off, the reference voltage VR1 changes (increases) at a given rate (a slope) from the reference voltage VR0. In the present example, during a period when the switch circuit SW1 is turned off, the reference voltage VR1 is generated by adding a slope voltage, which increases at a given slope, to the reference voltage VR0.

The comparator 40 generates a signal S1 according to a result of a comparison of the feedback voltage VFB with the reference voltage VR1. In the present example, the comparator 40 generates the signal S1 of an L level when the feedback voltage VFB is higher than the reference voltage VR1, and generates the signal S1 of an H level when the feedback voltage VFB is lower than the reference voltage VR1. The signal S1 is supplied to a set terminal S of the RS-FF circuit 60.

The oscillator 61 is coupled to a reset terminal R of the RS-FF circuit 60 and generates a clock signal CLK having a given frequency. The clock signal CLK is a pulse signal generated in a constant cycle, for example, in response to the signal S1 of the H level supplied to the set terminal S, the RS-FF circuit 60 outputs an output signal S2 of an H level from an output terminal Q and outputs an output signal S3 of an L level from an inverting output terminal XQ. In response to the clock signal CLK of the H level supplied to the reset terminal R, the RS-FF circuit 60 outputs the output signal S2 of an L level and the output signal S3 of an H level. That is the signal S1 of the H level functions as a set signal of the RS-FF circuit 60, and the clock signal CLK of the H level functions as a reset signal of the RS-FF circuit 60. The output signals S2 and S3 of the RS-FF circuit 60 are supplied to the drive circuit 62. The output signal S3 is also supplied to the switch circuit SW1 of the reference voltage generation circuit 50.

The drive circuit 62 generates the control signals DH and DL, which complementarily activate and deactivate the transistors T1 and T2 of the converter unit 2, based on the output signals S2 and S3 of the RS-FF circuit 60. In the present example, the drive circuit 62 generates the control signals DH and DL of an L level in response to the output signal S2 of the H level and the output signal S3 of the L level and generates the control signals DH and DL of an H level response to the output signal S2 of the L level and the output signal S3 of the H level. The transistor T1 is activated by the control signal DH of the L level and is deactivated by the control signal DH of the H level. The transistor T2 is activated by the control signal DL of the H level and is deactivated by the control signal DL of the L level. The drive circuit 62 may set a dead time of the control signals DH and DL such that the transistors T1 and T2 are not simultaneously activated.

In the control circuit 3, when the reference voltage VR1 becomes higher than the feedback voltage VFB (see time t1 in FIG. 2), the comparator 40 generates the signal S1 of the H level. In response to the signal S1 of the H level, the RS-FF circuit 60 generates the output signal S2 of the H level and the output signal S3 of the L level. Then, in response to the output signal S2 of the H level and the output signal S3 of the L level, the drive circuit 62 generates the control signals DH and DL of the L level. Accordingly, the transistor T1 is activated by the control signal DH of the L level, and the transistor T2 is deactivated by the control signal DL of the L level. In this manner, when the reference voltage VR1 exceeds the feedback voltage VFB, the control circuit 3 generates the control signal DH of the H level to activate the transistor T1. That is, an ON timing of the transistor T1 is determined according to a result of a comparison of the feedback voltage VFB with the reference voltage VR1. In the following description, a period during which the transistor T1 is activated is referred to as an ON period Ton (see time t1 to t2 in FIG. 2).

When the output signal S3 of the L level is output from the RS-FF circuit 60 (time t1), the switch circuit SW1 of the reference voltage generation circuit 50 is activated. Then, the first terminal and the second terminal of the capacitor C1 are short-circuited. Accordingly, a charge accumulated in the capacitor C2 is discharged, and a voltage of the first terminal (the node N2) of the capacitor C2, that is, the reference voltage VR1, is reset to a voltage of the second terminal of the capacitor C1. Consequently, during the ON period Ton of the transistor T1, the reference voltage VR1 is maintained to a constant level equal to the reference voltage VR0 (time t1 to t2).

When the reference voltage VR1 is reset to a voltage of the second terminal of the capacitor C2, that is, when the reference voltage VR1 becomes lower than the feedback voltage VFB, the comparator 40 generates the signal S1 of the L level. The capacitor C2 is discharged, when the switch circuit SW1 is turned on by the output signal S3 of the L level output from the RS-FF circuit 60. Therefore, the comparator 40 generates the signal S1 of the H level during a delay time period from a time point (time t1) at which the reference voltage VR1 becomes higher than the feedback voltage kin to a time point at which the reference voltage VR1 becomes lower than the feedback voltage VFB due to the discharge of the capacitor C2.

Subsequently, the dock signal CLK of a constant cycle that is output from the oscillator 61 rises to an H level (time t2). In response to the dock signal CLK of the H level, the RS-FF circuit 60 outputs the output signal S2 of the L level and the output signal S3 of the H level. Then, the drive circuit 62 generates the control signals DH and DL of the H level in response to the output signal S2 of the L level and the output signal S3 of the H level. Accordingly the transistor T1 is deactivated by the control signal DH of the H level, and the transistor T2 is activated by the control signal DL of the H level. In this manner, the control circuit 3 generates the control signal DH of the H level that deactivates the transistor T1 in each constant cycle. In the following description, a period during which the transistor T1 is deactivated is referred to as an OFF period Toff (see time t2 to t3 in FIG. 2).

When the output signal S3 of the H level is output from the RS-FF circuit 60 (time t2), the switch circuit SW1 of the reference voltage generation circuit 50 is turned off. Then, the capacitor C2 is charged by the current I1 supplied from the constant current source 51. Accordingly, as illustrated by time t2 to t3 FIG. 2, during the OFF period Toff of the transistor T1, the reference voltage VR1 increases at a slope (a rate) according to the current I1. That is, during the OFF period Toff, a voltage generated by adding a slope voltage, which increases at the slope according to the current I1, to the reference voltage VR0 is supplied to the comparator 40 as the reference voltage VR1.

When the reference voltage VR1 becomes larger than the feedback voltage VFB again (time t3), the control circuit 3 activates the transistor T1. By repeating this operation, the output voltage Vo is maintained at a target voltage according to the reference voltage VR0.

Figure 3:
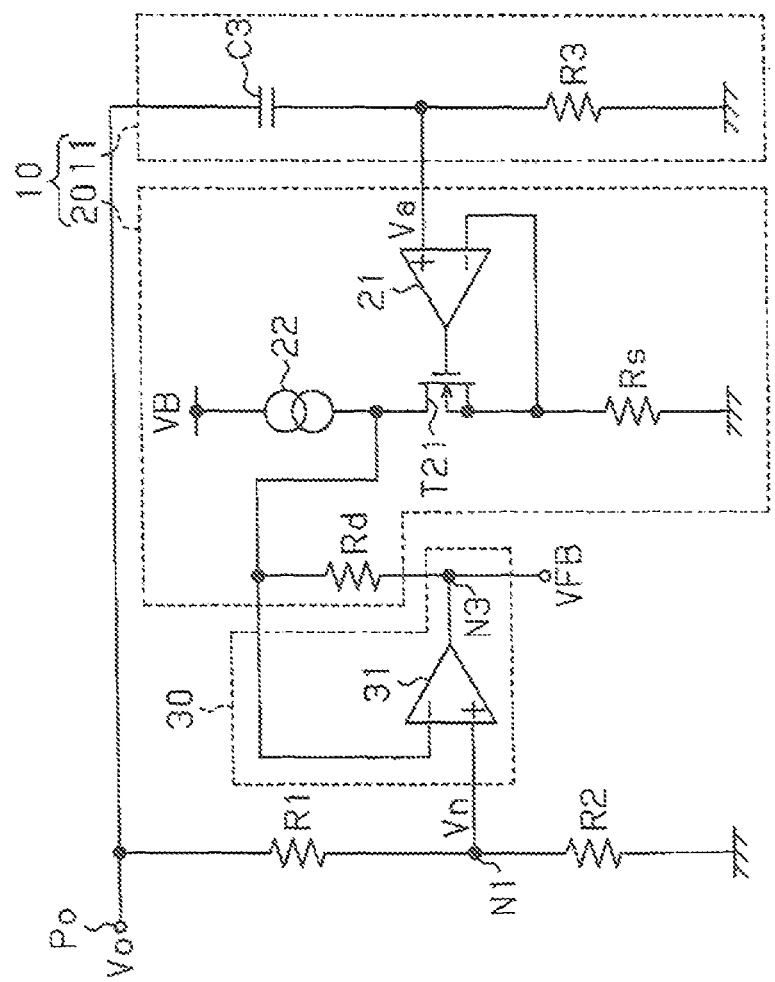
FIG. 3 is a circuit diagram illustrating an example of an internal structure of a gain adjustment circuit and an addition circuit provided in the DC-DC converter of FIG. 1.

An example of an internal structure of the gain adjustment circuit 10 and the addition circuit 30 will now be described with reference to FIG. 3.

The AC coupling unit 11 includes a capacitor C3 and a resistor R3. The capacitor C3 has a first terminal, which is coupled to the output terminal Po, and a second terminal, which is coupled to a first terminal of the resistor R3. A second terminal of the resistor R3 is coupled to the ground. A connection node between the capacitor C3 and the resistor R3 is coupled to an input terminal of the gain adjustment unit 20. The capacitor C3 serves as a coupling capacitor. The capacitor C3 removes a DC component from the output voltage Vo by AC coupling and generates an AC component of the output voltage Vo as an AC signal Va. The AC signal Va is supplied to the gain adjustment unit 20.

The gain adjustment unit 20 includes an amplifier circuit 21, an N-channel MOS transistor T21, a resistor Rs, a constant current source 22, and a resistor Rd. The amplifier circuit 21 has a non-inverting input terminal, which is coupled to the connection node between the capacitor C3 and the resistor R3 and receives the AC signal Va, an inverting input terminal, which is coupled to a first terminal of the resistor Rs, and an output terminal. The transistor T21 has a gate coupled to an output terminal of the amplifier circuit 21, a drain coupled to a first terminal of the constant current source 22, and a source coupled to both the inverting input terminal of the amplifier circuit 21 and the first terminal of the resistor Rs. A second terminal of the resistor Rs is coupled to the ground. A second terminal of the constant current source 22 is coupled to the power source line to which the bias voltage VB is supplied.

The amplifier circuit 21 is a buffer that serves as, for example, a voltage follower and is formed by an operational amplifier that has a gain of times. The amplifier circuit 21 controls the transistor T21 such that a voltage of the inverting input terminal of the amplifier circuit 21 becomes equal to a voltage value of the AC signal Va. In the present example, the amplifier circuit 21 controls the transistor T21 such that a voltage of the first terminal of the resistor Rs becomes equal to a voltage value of the AC signal Va. Therefore, a current according to a resistance value of the resistor Rs and a potential difference (the AC signal Va) between the first and second terminals of the resistor Rs flows to the resistor Rs. In this manner, the amplifier circuit 21, the transistor T21, constant current source 22, and the resistor Rs convert a voltage of the AC signal Va into a current.

A connection node between the constant current source 22 and the transistor T21 is coupled to a first terminal of the resistor Rd. The addition circuit 30 includes an amplifier circuit 31. The amplifier circuit 31 has a non-inverting input terminal, an inverting input terminal coupled to the first terminal of the resistor Rd, and an output terminal coupled to a second terminal of the resistor Rd. A current according to the AC signal Va flows to the resistor Rd. The resistor Rd converts a current according to the AC signal Va into a voltage. A potential difference generated between the first and second terminals of the resistor Rd corresponds to the output signal Sa.

The gain adjustment unit 20 amplifies the C signal Va by a gain A (Rd/Rs). The gain A is adjusted by a resistance ratio between the resistors Rs and Rd.

In the addition circuit 30, the non-inverting input terminal of the amplifier circuit 31 is coupled to the node N1 between the resistors R1 and R2 and receives the divided voltage Vn. An output terminal of the amplifier circuit 31 is coupled to the inverting input terminal of the amplifier circuit 31 via the resistor Rd. Therefore, the amplifier circuit 31 feeds back the potential difference generated between the first and second terminals of the resistor Rd to the inverting input terminal thereof. A node N3 between the amplifier circuit 31 and the resistor Rd is coupled to the inverting input terminal of the comparator 40 (see FIG. 1). Therefore, an output voltage of the amplifier circuit 31, that is, a voltage of the node N3, is used as the feedback voltage VFB.

The amplifier circuit 31 is a buffer that serves as, for example, a voltage follower and is formed by an operational amplifier that has a gain of times. The amplifier circuit 31 generates the output voltage (the feedback voltage VFB) such that a voltage of the first terminal of the resistor Rd becomes equal to the divided voltage Vn supplied to the non-inverting input terminal of the amplifier circuit 31. That is, the amplifier circuit 31 generates the feedback voltage VFB at the node N3, by adding the signal Sa obtained by gain adjustment she AC signal Va to the divided voltage Vn generated at the node N1.

In the present embodiment, the DC-DC converter 1 is an example of a power supply device, the transistor T1 is an example of a switch circuit, the divided voltage Vn is an example of a first feedback voltage, the feedback voltage VFB is an example of a second feedback voltage, the reference voltage VR0 is an example of a first reference voltage, and the reference voltage VR1 is an example of a comparison reference voltage. The reference voltage generation circuit 50 is an example of a voltage generation circuit. The comparator 40, the RS-FF circuit 60, the oscillator 61, and the drive circuit 62 are an example of a switch control circuit. The amplifier circuit 21, the transistor T21, the constant current source 22, and the resistor Rs are an example of a current conversion circuit that performs a voltage-to-current conversion. The resistor Rd is an example of a voltage conversion circuit that performs a current-to-voltage conversion. The amplifier circuit 21 is an example of a first amplifier circuit, the transistor T21 is an example of a first transistor, the resistor Rs is an example of a first resistor, the resistor Rd is an example of a second resistor, the AC coupling unit 11 is an example of an AC coupling circuit, and the AC signal Va is an example of an alternating-current component of an output voltage.

The operation of the DC-DC converter 1 (particularly, the gain adjustment circuit 10 and the addition circuit 30) will now be described in comparison with a structure of a related art structure.

First, phase margin that may be secured by the capacitor C12 in the DC-DC converter 4 (FIG. 4 of the related art will now be described. The phase margin that may be secured by the capacitor C12 is calculated from a transmission function H2($s$) from the output terminal Po to the inverting input terminal of the comparator 80. The transmission function H2($s$) is expressed by the following Expression (1).

Expression (1):

$$H2(s) = \frac{R12}{R11+R12} \times \frac{sC12 \times R11 + 1}{sC12 \times \frac{R11 \times R12}{R11+R12} + 1} \quad (1)$$

When a value of a slope voltage added to the reference VR0 is sufficiently small relative to the reference voltage VR0, the following approximation Expression (2) is established.

Expression (2):

$$\frac{R12}{R11+R12} \approx \frac{VR0}{Vol} \quad (2)$$

Therefore, based on the above Expressions (1) and (2), phase margin ∠φ2max that may be secured by the capacitor C12 is expressed by the following Expression (3).

Expression (3):

$$\angle\phi2\max = \tan^{-1}\frac{1}{2}\left(\sqrt{\frac{Vol}{VR0}} - \sqrt{\frac{VR0}{Vol}}\right) \quad (3)$$

In the Expression (3), when a relationship between the output voltage Vo1 and the reference voltage VR0 is expressed as Vo1>>VR0, theoretically, phase margin of 90 degree may be secured. However, because input offset of the comparator 80 is expressed as (Vo1/VR0) times, output voltage precision is poor in the case of Vo1>>VR0. Therefore, in practice, the reference voltage VR0 is set as expressed by the following relational Expression (4), for example, Expression (4):

$$Vo1 \approx 2VR0 \quad (4)$$

When the relationship between the output voltage Vo1 and the reference voltage VR0 is expressed by Expression (4), the phase margin ∠φ2max that may be secured by the capacitor C12 becomes 19.47 degrees from the above Expression (3). To secure stability against oscillation, is preferable that the phase margin be secured by 30 degrees or more. Therefore, the phase margin may not be sufficiently secured solely by the capacitor C12.

When a resistance of a resistor R12 becomes infinite and the output voltage Vo1 becomes equal to the reference voltage VR0 (i.e., Vo1=VR0), the phase margin ∠φ2max that may be secured by the capacitor C12 becomes zero degrees, from the above Expression (3). Therefore, under a condition of Vo1=VR0, there is no effect of phase compensation by the capacitor C12. In this manner, in the DC-DC converter 4 of the related art, the AC component of the output voltage Vo1 extracted by the capacitor C12 is added, at the point (the node N1) where the divided voltage Vn is generated by the resistors R1 and R2, to the divided voltage Vn. Accordingly, there may be no effect of phase compensation by the capacitor C12 due to an influence of the resistor R12

In contrast, in the DC-DC converter 1 of the present embodiment, the AC coupling unit 11, which couples the AC component of the output voltage Vo, and the gain adjustment unit 20, which amplifies the AC signal Va output from the AC coupling unit 11 by the given gain A, are arranged in a path separate from a negative feedback path that passes through the voltage division circuit (the resistors R1 and R2) (see FIG. 1). Further, the addition circuit 30 is provided to add the output, signal Sa generated by the gain adjustment unit 20 to the divided voltage Vn at a point the node N3 in FIG. 3) that is different from the point (the node N1 in FIG. 1) where the divided voltage Vn fed back in the negative feedback path occurs. In this case, a transmission function, that is, the transmission function H1($S$) from the output terminal Po to the inverting Input terminal of the comparator 40, is expressed by the following Expression (5), Expression (5):

$$H1(s) = \frac{R2}{R1+R2} \times \frac{sC3 \times R3 \times \left(A \times \frac{R1}{R2} + A + 1\right) + 1}{sC3 \times R3 + 1} \quad (5)$$

When a value of a slope voltage added to the reference voltage VR0 is sufficiently small relative to the reference voltage VR0, the following approximation Expression (6) is established Expression (6):

$$\frac{R2}{R1+R2} \approx \frac{VR0}{Vo} \quad (6)$$

Therefore, based on the above Expressions (5) and (6), phase margin ∠φ1max that may be secured by the gain adjustment circuit 10 is expressed by the following Expression (7).

Expression (7):

$$\angle\phi1\max = \tan^{-1}\frac{A}{2} \times \frac{Vo}{VR0} \times \frac{1}{\sqrt{A \times \frac{Vo}{VR0} + 1}} \quad (7)$$

As is clear from the above Expression (7), the phase margin ∠φ1max may be sufficiently secured, by adjusting the gain A by the gain adjustment unit 20. For example, when a relationship between the output voltage Vo and the reference voltage VR0 is expressed by Vo=2VR0 and the gain adjustment unit 20 adjusts the gain A as illustrated by the following Expression (8), the phase margin ∠φ1max that may be secured by the gain adjustment circuit 10 becomes 41.81 degrees following the above Expression (7).

Expression (8):

$$A = \frac{Rd}{Rs} = 2 \quad (8)$$

Therefore, in the structure in which the gain adjustment circuit 10 and the addition circuit 30 are used, the phase margin may be secured by about 20 degrees more than the phase margin ∠ϕ2max (19.47 degrees) that may be secured by the capacitor C12 as in the structure of the related art.

When a resistance of the resistor R2 becomes infinite, and the output voltage Vo becomes equal to the reference voltage VR0 (i.e., Vo=VR0), the phase margin ∠ϕ1max that may be secured by the gain adjustment circuit 10 is expressed by the following Expression (9), instead of the above Expression (7).

Expression (9):

$$\angle \phi 1 max = \tan^{-1} \frac{A}{2} \times \frac{1}{\sqrt{A+1}} \quad (9)$$

Here, when the gain A is adjusted to "2" by the gain adjustment unit 20, the phase margin ∠ϕ1max that may be secured by the gain adjustment circuit 10 becomes 30 degrees. Thus, according to the structure in which the gain adjustment circuit 10 and the addition circuit 30 are used, the phase margin may be sufficiently secured, even when the output voltage Vo becomes equal to the reference voltage VR0.

Further, since a sufficient phase margin (for example, phase margin equal to or larger than 30 degrees) may be obtained by the gain adjustment circuit 10, which adjusts the gain A, and the addition circuit 30, a sufficient phase margin may be secured even when an equivalent series resistance ESR of the capacitor C1 is small. This point will be described below with reference to simulation results illustrated in FIG. 4A, FIG. 4B, and FIG. 5.

Figures 4A, 4B:
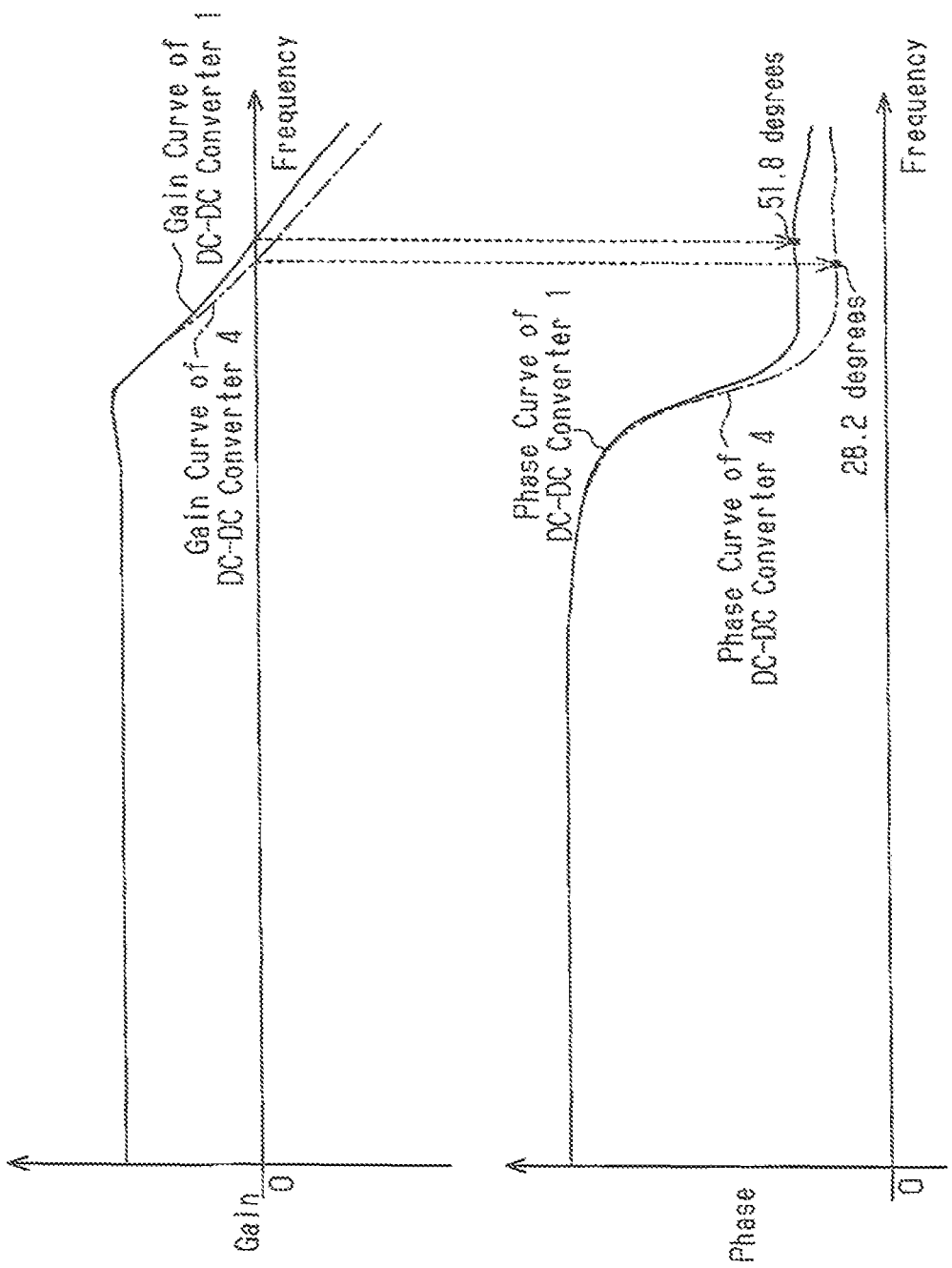
FIG. 4A is a graph illustrating relationship between a frequency and a gain in the DC-DC converter of FIG. 1.
FIG. 4B is a graph illustrating a relationship bet wee a frequency and a phase in the DC-DC cony ter of FIG. 1.

Each of FIG. 4A and FIG. 4B illustrates a frequency characteristic of the DC-DC converter 1 according to the present embodiment and a frequency characteristic of the DC-DC converter 4 of the related art. A graph in FIG. 4 illustrates gain curves that express changes in gains of negative feedback loops of the DC-DC converters 1 and 4 relative to frequencies. A graph in FIG. 4B illustrates phase curves that express changes in phases of gains relative to frequencies. FIG. 5 is a waveform diagram illustrating changes in the output voltages Vo and Vo1 when the output current to is suddenly changed in the DC-DC converters 1 and 4. The simulation results illustrated in FIG. 4A, FIG. 4, and FIG. 5 are obtained based on the following conditions. The input voltage Vi is 3.6 [V], the output voltages Vo and Vo1 are 12 [V], respectively, the reference voltage VR0 is 0.6 [V], a frequency of the clock signal CLK is 3 [MHz], capacitance values of the capacitors C1 and C11 are 20 [μF], respectively, inductance values of the coils L1 and L11 are 1.5 [μH], respectively, a capacitance value of the capacitor C12 is 8 [pF], resistance values of the resistors R1 and R2 are 100 [kΩ], respectively, the gain A is two times, a capacitance value of the capacitor C3 is 3 [pF], and a resistance value of the resistor R3 is 100 [kΩ]. FIG. 4A, FIG. 4B, and FIG. 5 illustrate the simulation results when the equivalent series resistance ESR is set to a small value in this case, 3 [mΩ]).

A zero point Z1 generated by the equivalent series resistance ESR is expressed by the following Expression (10).

Expression (10):

$$Z1 = \frac{1}{2\pi \times C1 \times ESR} \quad (10)$$

When the equivalent series resistance ESR becomes small, a zero-point frequency becomes a high frequency, and it becomes difficult to secure phase margin by the equivalent series resistance ESR. Therefore, in the DC-DC converter 4 of the related art, the phase margin is secured mainly by the capacitor C12. However, as described above, in the DC-DC converter 4 of the related art, a sufficient phase margin may not be secured by the capacitor L12. Therefore, as illustrated by the simulation result in FIG. 4B, in the DC-DC converter 4 of the related art, when the equivalent series resistance ESR is small, the phase margin may be secured by only 28.2 degrees, thus may not be sufficiently secured. In this case, as illustrated in FIG. 5, when a high-frequency operation is performed due to a sudden change in the output current Io, ringing occurs in the output voltage Vo1 because of shortage of the phase margin.

In contrast, in the DC-DC converter 1 of the present embodiment, even when it becomes difficult to secure the phase margin using the equivalent series resistance ESR, the phase margin may be secured sufficiently by the gain adjustment circuit 10 and the addition circuit 30. That is, as illustrated by the simulation result in FIG. 4B, a phase margin of 51.8 degrees is obtained by the DC-DC converter 1. Therefore, the phase margin may be secured by about 20 degrees more than that by the DC-DC converter 4 of the related art. In addition, as illustrated in FIG. 4A, in the DC-DC converter 1, since the gain adjustment circuit 10 is arranged in the path separate from the path in which the output voltage Vo is fed back from the output terminal Po to the comparator 40 via the resistors R1 and R2, a frequency band is spread to a higher frequency side than that in the DC-DC converter 4 of the related art. As illustrated in FIG. 5, according to the DC-DC converter 1 that secures a sufficient phase margin, occurrence of ringing in the output voltage Vo may be suppressed, even when a high-frequency operation is performed due to a sudden change in the output current Io. Therefore, in the DC-DC converter 1 that secures a sufficient phase margin, stability against oscillation improves more than that in the DC-DC converter 4 of the related art.

Figure 6:
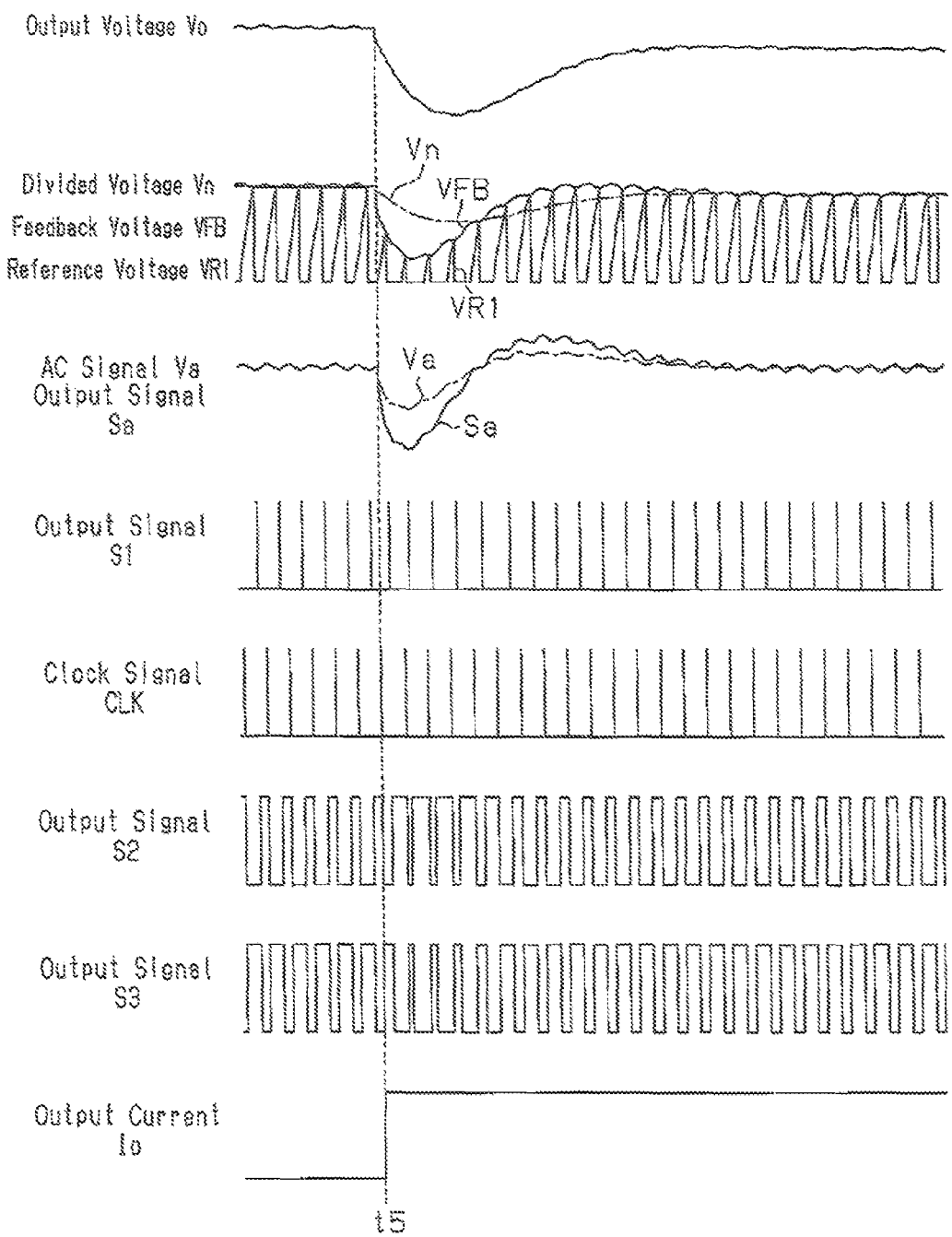
FIG. 6 is a waveform diagram illustrating a result of a simulation when a load suddenly changes in the DC-DC converter of FIG. 1.

The operation of the DC-DC converter 1 (the gain adjustment circuit 10 and the addition circuit 30) when a load suddenly changes will now be described with reference to a simulation result in FIG. 6.

At time t5, when a load sharply increases and the output current Io suddenly increases from 0 [A] to 1 [A], the output voltage Vo suddenly decreases. In the negative feedback circuit that feeds back from the output terminal Po to the comparator 40 through the voltage division circuit of the resistors R1 and R2, the output voltage Vo is divided by the resistors R1 and R2 and the divided voltage Vn is generated. At this time, the divided voltage Vn also varies depending on a variation component of the output voltage Vo. This reduces load responsiveness. To improve the load responsiveness, the gain adjustment circuit 10 promptly extracts a variation component (a reduction quantity) of the output voltage Vo as the AC signal Va and generates the output signal Sa by amplifying the AC signal Va by the given gain A. Then, the addition circuit 30 generates the feedback voltage VFB by adding the output signal Sa of the gain adjustment circuit 10 to the divided voltage Vn. Consequently, the variation component (the reduction quantity) of the output voltage Vo is promptly transmitted to the feedback voltage VFB through the gain adjustment circuit 10. Accordingly, after time t5, the feedback voltage VFB promptly reduces following the reduction of the output voltage Vo. As a result, a timing when the reference voltage VR1 exceeds the feedback voltage VFB becomes early as compared with a timing when the feedback voltage VFB is, for example, equal to the divided voltage Vn. When the reference voltage VR1 exceeds the feedback voltage VFB, the comparator 40 generates the output signal S1 of the H level, and the RS-FF circuit 60 generates the output signal S2 of the H level. Therefore, the transistor T1 is activated. As a result, the ON period Ton is promptly changed, and an ON duty is promptly changed. That is, since the transistor T1 is activated immediately after the load suddenly changes, the ON period Ton is changed to be increased. This increases the ON duty. Therefore, the reduced output voltage Vo may be promptly increased. Namely, the output voltage Vo may be converged to a target voltage in a short time from the sudden change in the load. In this manner, in the DC-DC converter 1 according to the present embodiment, the gain adjustment circuit 10 and the addition circuit 30 promptly transmit the variation component of the output voltage Vo to the feedback voltage VFB. This improves the load responsiveness.

The power supply device of one embodiment has the following advantages.

(1) The control circuit 3 generates the feedback voltage VFB by adding the signal Sa, which is obtained by amplifying the AC component of the output voltage Vo by a given gain A, to the divided voltage Vn of the output voltage Vo. Thus, the phase margin is controlled by adjusting the gain A. Therefore, a sufficient phase margin may be secured by properly adjusting the gain A.

(2) Variation component of the output voltage Vo is promptly transmitted to the feedback voltage VFB. This improves load responsiveness.

The gain adjustment unit 20 adjusts the gain A by a resistance ratio between the resistors Rs and Rd. Therefore, the gain A may be adjusted by changing resistance values of the resistors Rs and Rd. Accordingly, the gain A may be easily adjusted, and consequently, a securable phase margin may be easily controlled.

(4) A sufficient phase margin is secured by the gain adjustment circuit 10. Therefore, a ceramic capacitor of which the equivalent series resistance ESR is small may be used for the capacitor C1. Consequently, the DC-DC converter 1 may be made compact and may be provided at low cost.

It should be apparent to those skilled in the art that the aforementioned embodiments may be embodied in many other forms without departing from the scope of the invention. Particularly, it should be understood that the aforementioned embodiments may be embodied in the following forms.

Figure 7:
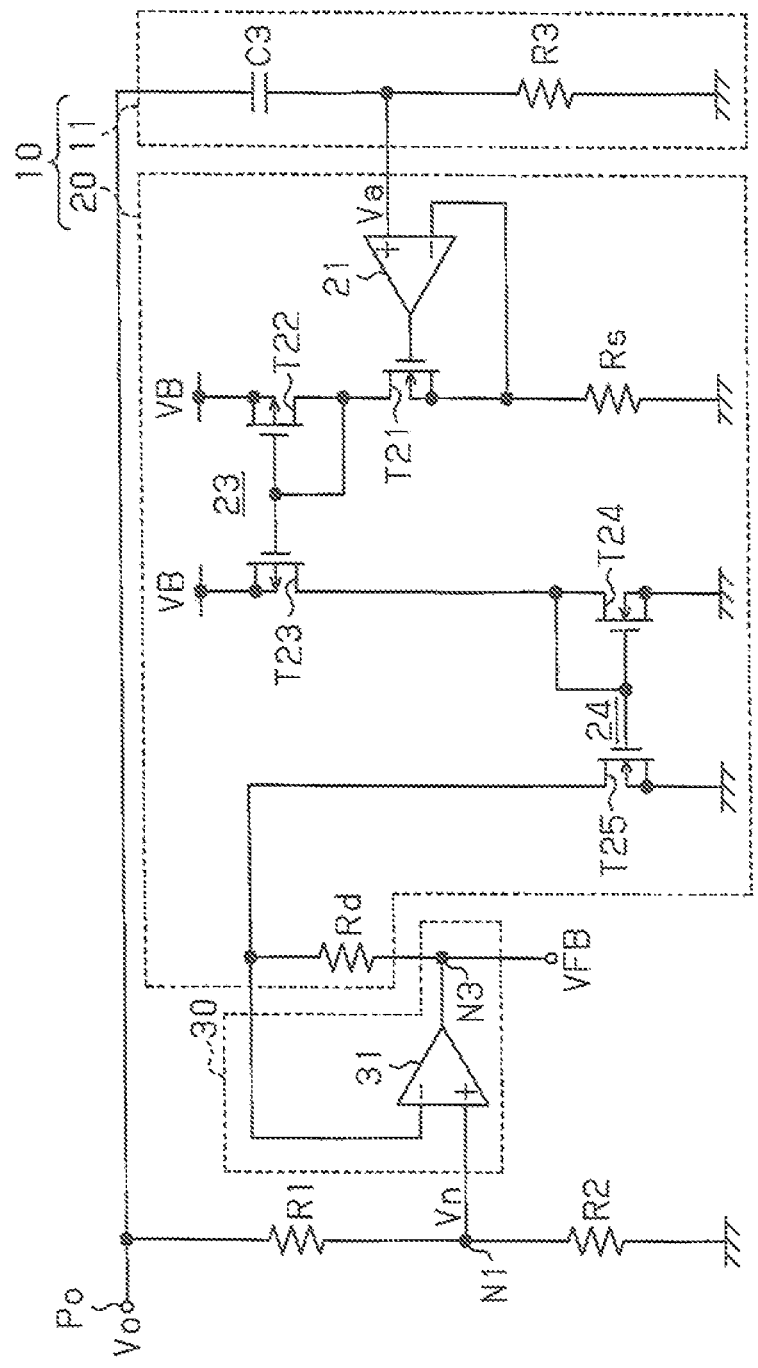
FIG. 7 is a circuit diagram illustrating a modification of the gain adjustment circuit and the addition circuit provided in the DC-DC converter of FIG. 1.

As illustrated in FIG. 7, current mirror circuits 23 and 24 may be added to the gain adjustment unit 20 of the gain adjustment circuit 10. The current mirror circuit 23 includes P-channel MOS transistors T22 and T23, and the current mirror circuit 24 includes N-channel MOS transistors. T24 and T25. The transistor T22 has a source to which the bias voltage VB is supplied, a drain coupled to the drain of the transistor T21, and a gate coupled to the drain of the transistor T22. The transistor T23 has a source to which the bias voltage VB is supplied, a gate coupled to the gate of the transistor T22, and a drain. The current mirror circuit 23 passes a current proportional to a current flowing to the resistor Rs, to the transistor T23, in accordance with an electric characteristic (a mirror ratio) of the transistors T22 and T23.

The transistor T24 has a so rce coupled to the ground, a drain coupled to the drain of the transistor T23, and a gate coupled to the drain of the transistor 724. The transistor T25 has a source coupled to the ground, a gate coupled to the gate of the transistor T24, and a drain coupled to the resistor Rd and the inverting input terminal of the amplifier circuit 31. The current mirror circuit 24 passes a current proportional to a current flowing to the transistor T23, to the transistor T2, and the resistor Rd, in accordance with an electric characteristic (a mirror ratio) of the transistors T24 and T25.

The gain adjustment unit 20 that includes the current mirror circuits 23 and 24 may also adjust the gain A by a mirror ratio between the current mirror circuits 23 and 24, not only by the resistance values of the resistors Rs and Rd.

In the above embodiment (FIG. 1), the output signal Sa obtained by adjusting the gain of the AC component (the AC signal Va) of the output voltage V0 is added to the feedback voltage VFB. However, the output signal Sa may be also added to the reference voltage VR0.

Figure 8:
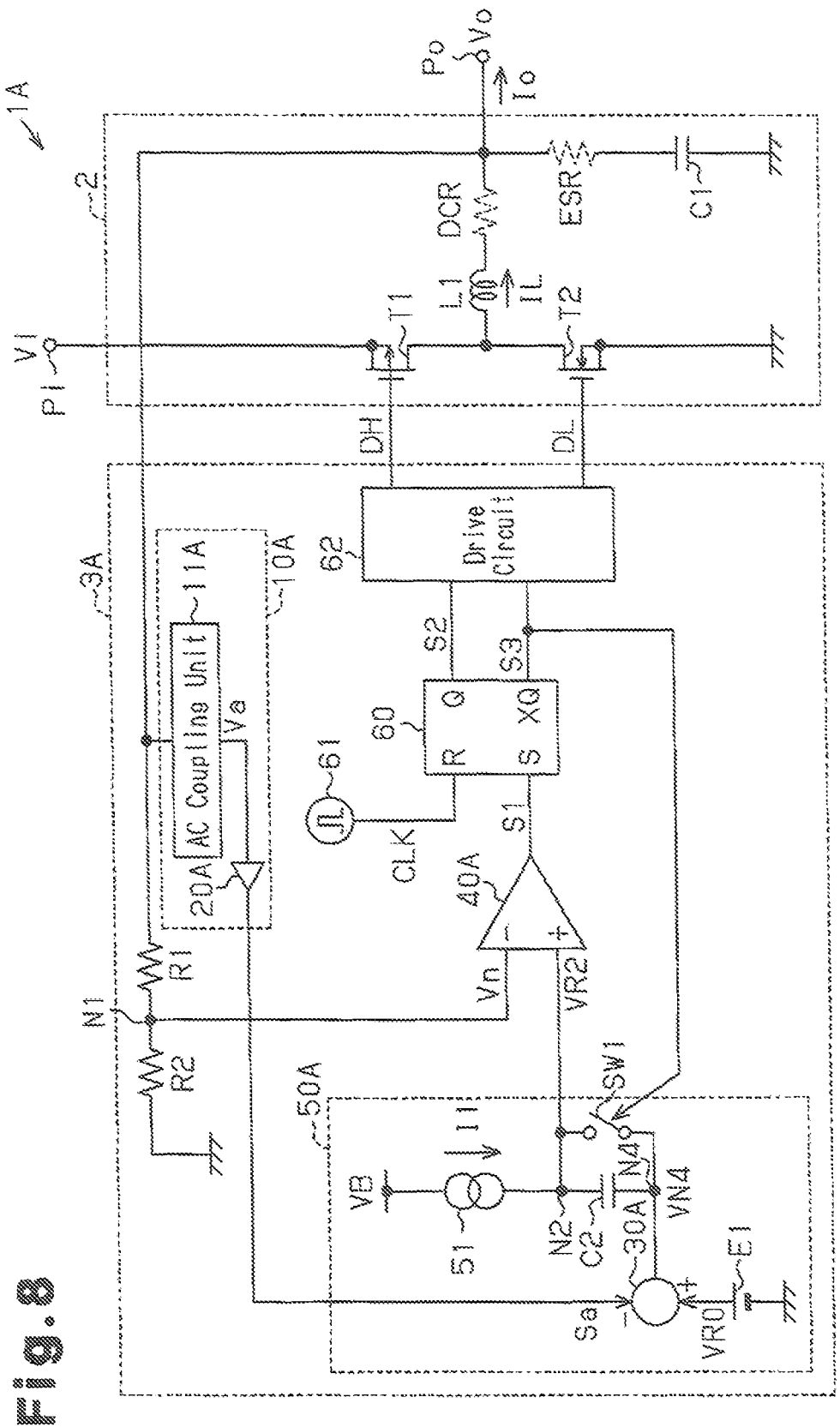
FIG. 8 is a block circuit diagram illustrating a modification of the control circuit provided in the DC-DC converter of FIG. 1.

For example, in a DC-DC converter 1A illustrated in FIG. 8, the control circuit 3A includes a gain adjustment circuit 10A, an addition circuit 30A, a comparator 40A, and a reference voltage generation circuit 50A. Elements that are the same as or similar to those illustrated in FIG. 1 to FIG. 7 are indicated with the same reference symbols, and a detailed explanation of these elements is omitted.

The gain adjustment circuit 10A includes an AC coupling unit 11A and a gain adjustment unit 20A. The AC coupling unit 11A generates the AC signal Va by extracting an AC component of an output voltage Vo in a similar manner to that of the AC coupling unit 11. The gain adjustment unit 20A generates an output signal Sa by adjusting a gain of an AC signal Va in a similar manner to that of the gain adjustment unit 20.

The addition circuit 30A receives the output signal Sa of the gain adjustment unit 20A and a reference voltage VR0 generated by a reference power supply E1. The addition circuit 30A has an output terminal coupled to a node N4 between a capacitor C2 and a switch circuit SW1. The addition circuit 30A subtracts the output signal Sa from the reference voltage VR0 to generate a correction reference voltage VN4 at the node N4.

In the reference voltage generation circuit 50A, when the switch circuit SW1 is turned on first and second terminals of the capacitor C2 are short-circuited. In this case, a potential of the first terminal (a node N2) of the capacitor C2 becomes equal to the correction reference voltage VN4. Thus, the correction reference voltage VN4 is supplied to a non-inverting input terminal of the comparator 40A as a reference voltage VR2. On the other hand, when the switch circuit SW1 is turned off, a potential difference between the first and second terminals of the capacitor C2 increases according to a current I1 supplied from a constant current source 51. At this time, a potential of the second terminal of the capacitor C2 corresponds to the correction reference voltage VN4. Thus, a potential of the first terminal (the node N2) of the capacitor C2 becomes a potential obtained by adding a potential difference between the first and second terminals of the capacitor C2 to the correction reference voltage VN4. Then, the potential of the first terminal (the node N2) of the capacitor C2 is supplied to the non-inverting input terminal of the comparator 40A as the reference voltage VR2.

In this manner, the reference voltage VR2 becomes equal to the correction reference voltage VN4 during a period when the switch circuit SW1 is turned on, and changes (increases) at a given rate (a slope) from the correction reference voltage VN4 during a period when the switch circuit SW1 is turned off.

A divided voltage obtained by dividing the output voltage Vo by resistors R1 and R2 is supplied to an inverting input terminal of the comparator 40A. The comparator 40A generates an output signal S1 of an L level when the divided voltage Vn is higher than the reference voltage VR2, and generates the signal S1 of an H level when the divided voltage Vn is lower than the reference voltage VR2.

Figure 9:
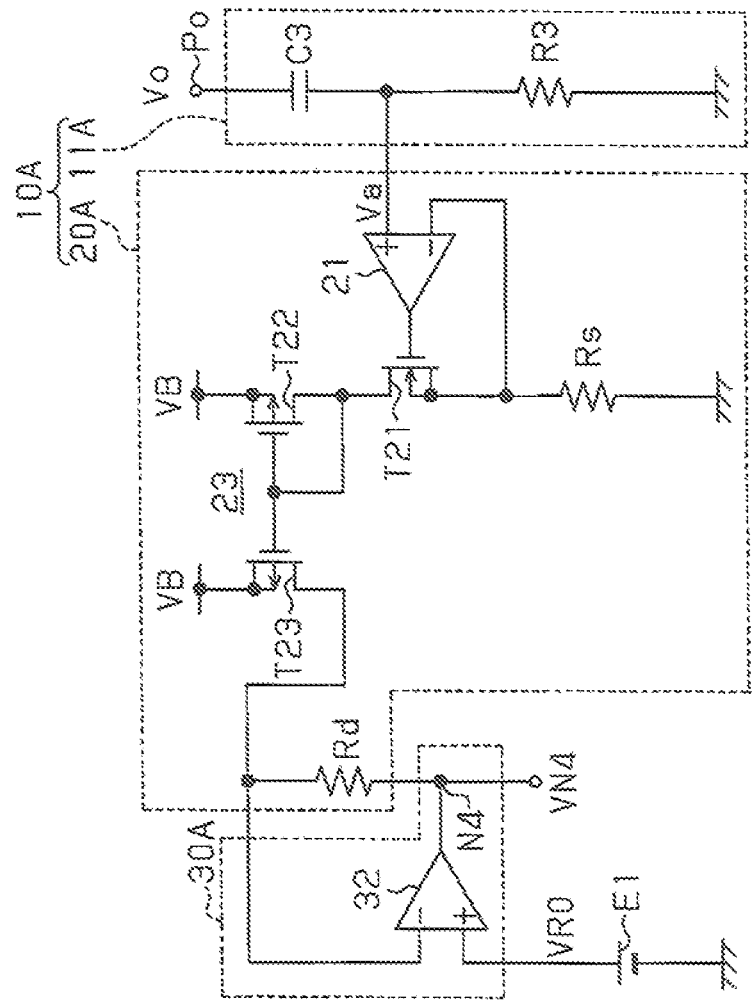
FIG. 9 is a circuit diagram illustrating an example of an internal structure of a gain adjustment circuit and an addition circuit provided in the DC-DC converter of FIG. 8.

An example of an internal structure of the gain adjustment circuit 10A and the addition circuit 30A will now be described with reference to FIG. 9.

In a similar manner to that of the AC coupling unit 11, the AC coupling unit 11A includes a capacitor C3 and a resistor R3 that are coupled in series between an output terminal Po and a ground.

The gain adjustment unit 20A includes an amplifier circuit 21, a transistor T21, a resistor Rs, a current mirror circuit 23, and a resistor Rd. The AC signal Va from the AC coupling unit 11A is supplied to a non-inverting input terminal of the amplifier circuit 21. An output terminal of the amplifier circuit 21 is coupled to a gate of the transistor T21. The current mirror circuit 23 includes P-channel MOS transistors T22 and T23. The resistor Rs is coupled between a source of the transistor T21 and the ground. The resistor Rd has a first terminal, which is coupled to both an output terminal of the current mirror circuit 23 (a drain of the transistor T23) and an inverting input terminal of an amplifier circuit 32 provided in the addition circuit 30A, and a second terminal, which is coupled to an output terminal of the amplifier circuit 32.

The gain adjustment unit 20A amplifies the AC signal Va by the gain A that is adjusted by a resistance ratio between the resistors Rs and Rd and a mirror ratio of the current mirror circuit 23.

The reference voltage VR0 generated by the reference power supply E1 is supplied to the non-inverting input terminal of the amplifier circuit 32. A connection node between the output terminal of the amplifier circuit 32 and the resistor Rd corresponds to the node N4. That is, the output voltage of the amplifier circuit 32 at the node N4 corresponds to the core ion reference voltage VN4.

The amplifier circuit 32 is a buffer that serves as, for example, a voltage follower and is formed by an operational amplifier that has a gain of "1" times. The amplifier circuit 32 generates the output voltage (the correction reference voltage VN4) such that a voltage of the first terminal of the resistor Rd becomes equal to the reference voltage VR0 supplied to the non-inverting input terminal of the amplifier circuit 32. That is, the amplifier circuit 32 generates the correction reference voltage VN4 at the node N4 by subtracting the signal Sa obtained by gain adjustment of the AC signal Va from the reference voltage VR0.

In the DC-DC converter 1A structured as described above, the output signal Sa obtained by adjusting the gain of the AC component (the AC signal Va) of the output voltage Vo is transmitted to the reference voltage VR2 by means of subtracting the output signal Sa from the reference voltage VR0. Therefore, a variation component of the output voltage Vo is promptly reflected to the reference voltage VR2. Accordingly, the DC-DC converter 1A also has an advantage similar to the advantage obtained by the DC-DC converter 1.

The reference voltage generation circuit 50A is an example of a voltage generation circuit, the divided voltage Vn is an example of a first feedback voltage, the correction reference voltage VN4 is an example of a second reference voltage, the reference voltage VR2 is an example of a comparison reference voltage, the AC coupling unit 11A is an example of an AC coupling circuit, and amplifier circuit 32 is an example of a second amplifier circuit.

In the above embodiment (FIG. 1), the output signal Sa obtained by adjusting the gain of the AC component (the AC signal Va) of the output voltage Vo is added to a feedback voltage VFB. However, the output signal Sa may be also added to both the reference voltage VR0 and the feedback voltage VFB.

Figure 10:
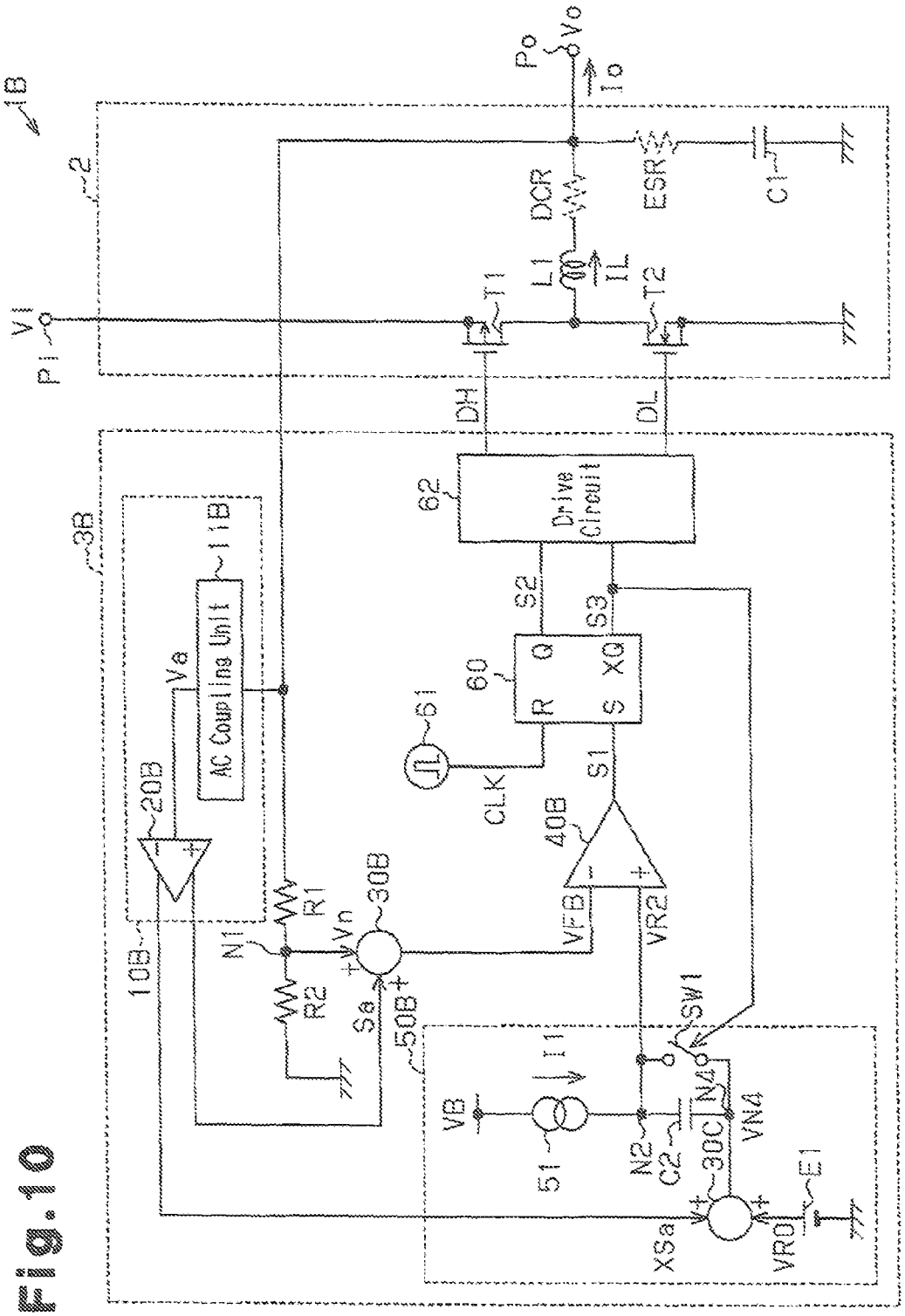
FIG. 10 is a block circuit diagram illustrating another modification of the control circuit provided in the DC-DC converter of FIG. 1.

For example, in a DC-DC converter 1B illustrated in FIG. 10, a control circuit 3B includes a gain adjustment circuit 10B, addition circuits 30B and 30C, a comparator 40B, and a reference voltage generation circuit 50B. Elements that are the same as or similar to those illustrated in FIG. 1 to FIG. 9 are indicated with the same reference symbols, and a detailed explanation of these elements omitted.

The gain adjustment circuit 10B includes an AC coupling unit 11B and a gain adjustment unit 20B. The AC coupling, unit 11B generates an AC signal Va by extracting an AC component of an output voltage Vo in a similar manner to that of the AC coupling unit 11. The gain adjustment unit 20B is a differential-gain adjustment circuit and differentially outputs a pair of signals by adjusting a gain of the AC signal V. That is, the gain adjustment unit 20B generates an output signal Sa by adjusting a gain of the AC signal Va in a similar manner to that of the gain adjustment unit 20, and also generates an inversion signal XSa by inverting the output signal Sa with respect to a ground level.

In a similar manner to that of the addition circuit 30, the addition circuit 30B generates a feedback voltage VFB by adding the output signal Sa of the gain adjustment unit 20B to a divided voltage Vn, and supplies the feedback voltage VFB to an inverting input terminal of a comparator 40.

The addition circuit 30C generates a correction reference voltage VN4 by adding the inversion signal XSa of the gain adjustment unit 20B to a reference voltage VR0. As described above, the inversion signal XSa is generated by inverting the output signal Sa to the ground level. Therefore, the correction reference voltage VN4 generated by the addition circuit 30C corresponds to the voltage obtained by subtracting the output signal Sa of the gain adjustment unit 20B from the reference voltage VR0.

In a similar manner to that of the reference voltage generation circuit 50A, a reference voltage VR2 generated by the reference voltage generation circuit 50B becomes equal to the correction reference voltage VN4 during a period when a switch circuit SW1 is turned on, and the reference voltage VR2 increases at a given ratio from the correction reference voltage VN4 during a period when the switch circuit SW1 is turned off. The reference voltage generation circuit 50B supplies the reference voltage VR2 to non-inverting input terminal of the comparator 40B.

The comparator 40B generates an output signal S1 of an L level when the feedback voltage VFB is higher than the reference voltage VR2, and generates the signal S1 of an H level when the feedback voltage VFB is lower than the reference voltage VR2.

An example of an internal structure of the gain adjustment circuit 10B and the addition circuits 30B and 30C will now be described.

Figure 11:
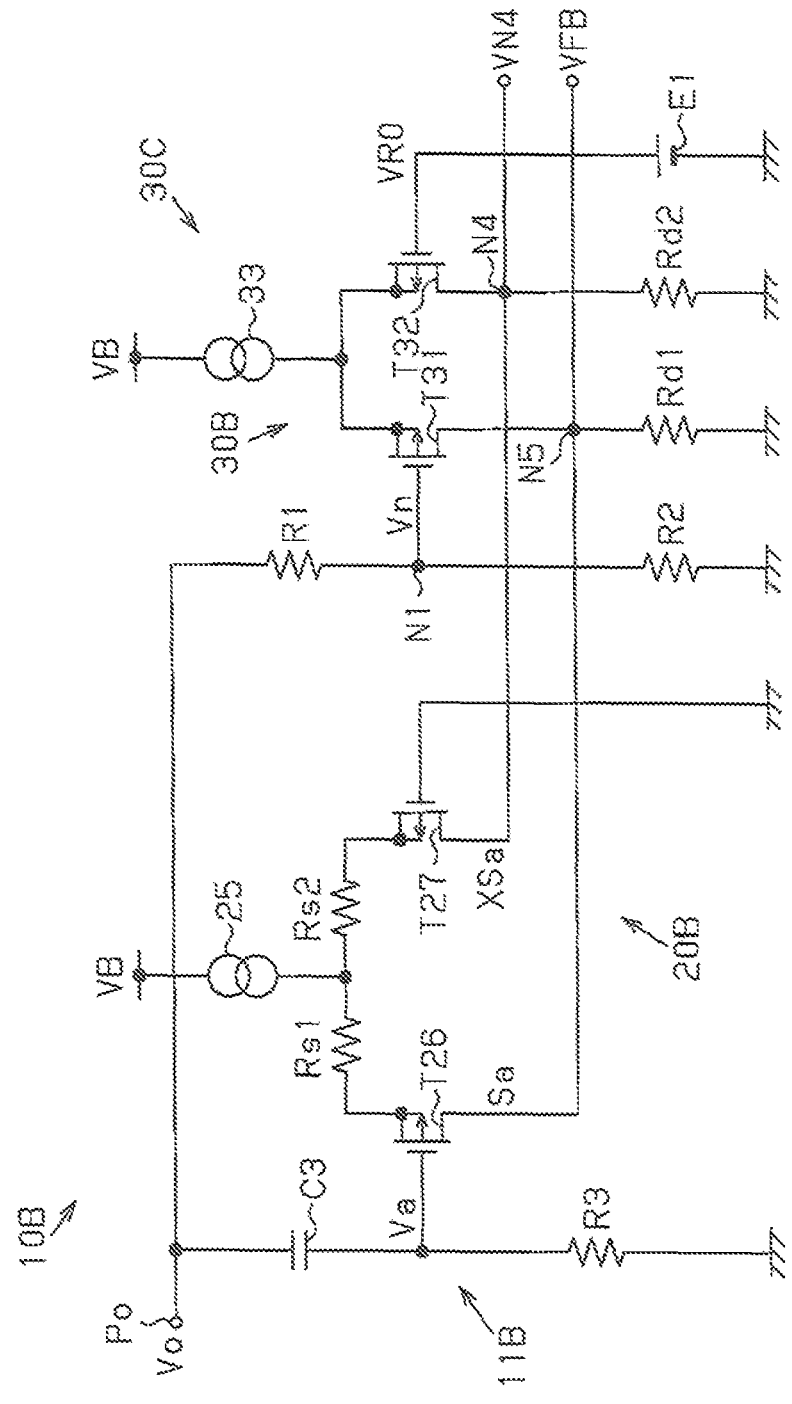
FIG. 11 is a circuit diagram illustrating an example of an internal structure of a gain adjustment circuit and an addition circuit provided in the DC-DC converter of FIG. 10.

As illustrated in FIG. 11, the gain adjustment unit 20B includes a constant current source 25, resistors Rs1 and Rs2, P-channel MOS transistors T26 and T27, and resistors Rd1 and Rd2. The transistor T26 has a gate coupled to a connection node between a capacitor C3 and a resistor R3 in the AC coupling unit 11B, a first terminal that is coupled to a first terminal of the resistor Rs1, and a second terminal that is coupled to a first terminal of the resistor Rd1. A second terminal of the resistor Rd1 is coupled to the ground. A node N5 between the transistor T26 and the resistor Rd1 is coupled to an inverting input terminal of the comparator 40B (see FIG. 10).

A second terminal of the resistor Rs1 is coupled to a first terminal of the resistor Rs2. The P-channel MOS transistor T27 has a gate coupled to the ground, a first terminal coupled to a second terminal of the resistor Rs2, and a second terminal coupled to a first terminal of the resistor Rd2. A second terminal of the resistor Rd2 is coupled to the ground. A node between the transistor T27 and the resistor Rd2 corresponds to the node N4 between the switch circuit SW1 and the capacitor C2 in the reference voltage generation circuit 50B (see FIG. 10).

A connection node between the resistors Rs1 and Rs2 is coupled to a first terminal of the constant current source 25. A second terminal of the constant current source 25 is coupled to a power source line to which a bias voltage VB is supplied.

The addition circuit 30B includes a P-channel MOS transistor T31 and a constant current source 33. The transistor T31 has a gate coupled to a node N1 where the divided voltage Vn of the output voltage Vo occurs, a first terminal coupled to a first terminal of the constant current source 33, and a second terminal coupled to both a first terminal of the resistor Rd1 and a second terminal (that is, the node N5) of the transistor T26. A second terminal of the constant current source 33 is coupled to the power source line to which the bias voltage VB is supplied.

The addition circuit 30C includes a P-channel MOS transistor T32 and the constant current source 33. The transistor T32 has a gate that receives the reference voltage VR0 generated by the reference power supply E1, a first terminal coupled to both the first terminal of the constant current source 33 and the first terminal of the transistor T31, and a second terminal coupled to both the first terminal of the resistor Rd2 and the second terminal (that is, the node N4) of the transistor T27.

The addition circuit 30B generates, at the node N5, the feedback voltage VFB which is an addition signal of the divided voltage Vn and the output signal Sa. The addition circuit 30C generates, at the node N4, the correction reference voltage VN4 which is an addition signal of the reference voltage VR0 and the inversion signal XSa.

In the DC-DC converter 16 structured as described above, the signals Sa and XSa that are obtained by adjusting the gain of the AC component the AC signal Va) of the output voltage Vo are transmitted to the feedback voltage VFB and the reference voltage VR2, respectively. Therefore, the DC-DC converter 1B has an advantage similar to the advantage obtained in the DC-DC converter 1.

The addition circuit 30B is an example of a first addition circuit, the addition circuit 30C is an example of a second addition circuit, the reference voltage generation circuit 50B is an example of a voltage generation circuit. The constant current source 25, the transistors T26 and T27, and the resistors Rs1 and Rs2 are an example of a current conversion circuit. The resistors Rd1 and Rd2 are an example of a voltage conversion circuit. The constant current source 33 and the transistor T31 are an example of a first addition circuit. The constant current source 33 and the transistor T32 are an example of a second addition circuit. The output signal Sa is an example of a first output signal, and the inversion signal XSa is an example of a second output signal.

Figure 12:
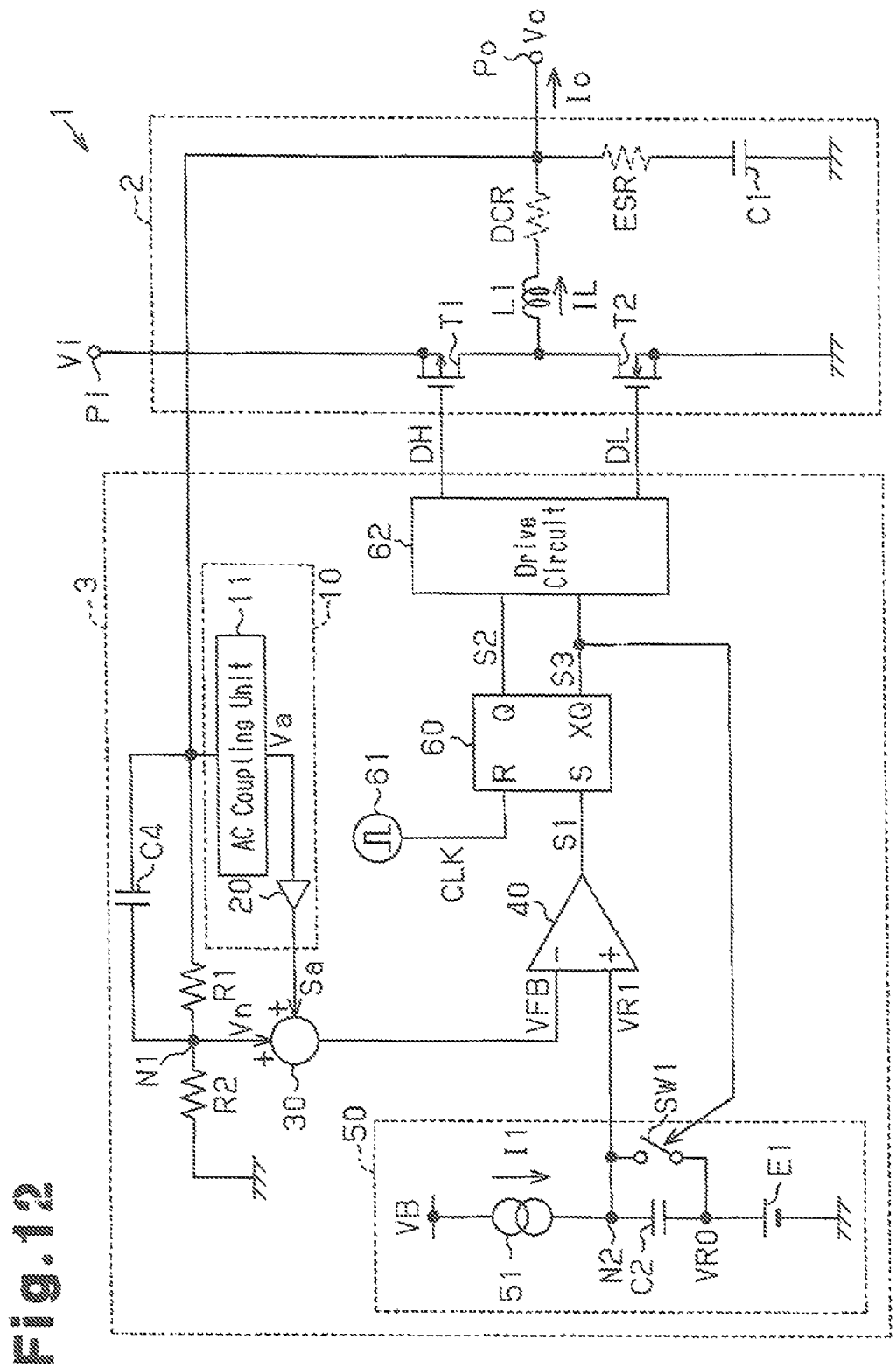
FIG. 12 is a block circuit diagram illustrating still another modification of the control circuit provided in the DC-DC converter of FIG. 1.

As illustrated in FIG. 12, a capacitor C4 may be coupled in parallel to the resistor R1 of the DC-DC converter 1. With the capacitor C4, the phase margin may be adjusted separately from that of the gain adjustment circuit 10. Therefore, more phase margin may be secured. Similarly, the capacitor C4 may be coupled in parallel to the resistor R1 of each of the DC-DC converters 1A and 1B.

In the above embodiment (FIG. 1), the output signal Sa of the gain adjustment circuit 10 is added to the divided voltage Vn obtained by dividing the output voltage Vo by the resistors R1 and R2. However, the output signal Sa of the gain adjustment circuit 10 may be also added to, for example, the output voltage Vo. In this case, the output voltage Vo is an example of a first feedback voltage.

In the above embodiment, the output signal S3 is supplied to the switch circuit SW1 that is coupled in parallel to the capacitor C2 for generating a slope voltage. However, another signal (a voltage) may be also used in place of output signal S3, as long as the signal controls an ON period or an OFF period of the transistor T1. For example, any one of the control signals DH and DL, or a voltage of the connection node between the transistors T1 and T2 may be also used.

The reference voltage generation circuit 50 in the above embodiment (FIG. 1 and others) generates the reference voltage VR1 that changes at a fixed slope (a rate) from the reference voltage VR0. However the reference voltage generation circuit 50 may change a slope of the reference voltage VR1 in accordance with, for example, a variation of the input voltage Vi, a variation of the output voltage Vo, or a variation of a bad.

In the above embodiment (FIG. 1 and others), the transistor T1 is deactivated following the clock signal CLK that rises to an H level in a given cycle. However, the transistor may be deactivated, for example, after a lapse of a given time since a rise timing of the signal S1 output from the comparator 40, that is, the ON timing of the transistor T1. In this case, a timer circuit may be provided in place of the oscillator 61, for example. The timer circuit supplies a pulse signal, which rises to an H level after lapse of a time depending on the input voltage Vi or the output voltage Vo since the rise timing of the signal S1, to the reset terminal R of the RS-FF circuit 60. Alternatively, a one-shot flip-flip circuit may be provided in place of the RS-FF circuit 60 and the oscillator 61.

In the above embodiment (FIG. 1 and others), although the P-channel MOS transistor T1 has been used as an example of a switch circuit, an N-channel MOS transistor may be used as a switch circuit. A bipolar transistor may also be used as a switch circuit. Alternatively, a switch circuit that includes a plurality of transistors may be used.

In the above embodiment (FIG. 1 and others), the reference voltage VR0 may be also generated at an outside of the control circuit 3.

In the above embodiment (FIG. 1 and others), the transistors T1 and T2 may be also included in the control circuit 3. The converter unit 2 may be also included in the control circuit 3

In the above embodiment (FIG. 1 and others), although a synchronous rectification type DC-DC converter has been described, any one of the above various gain adjustment circuits may be also applied to a non-synchronous rectification type DC-DC converter.

In the above embodiment (FIG. 1 and others), an ON timing of the transistor T1 is controlled according to a result of a comparison of the feedback voltage VFB with the reference voltage VR1. Alternatively, an OFF timing of the transistor T1 may controlled according to the result of the comparison of the feedback voltage VFB with the reference voltage VR1.

Figure 13:
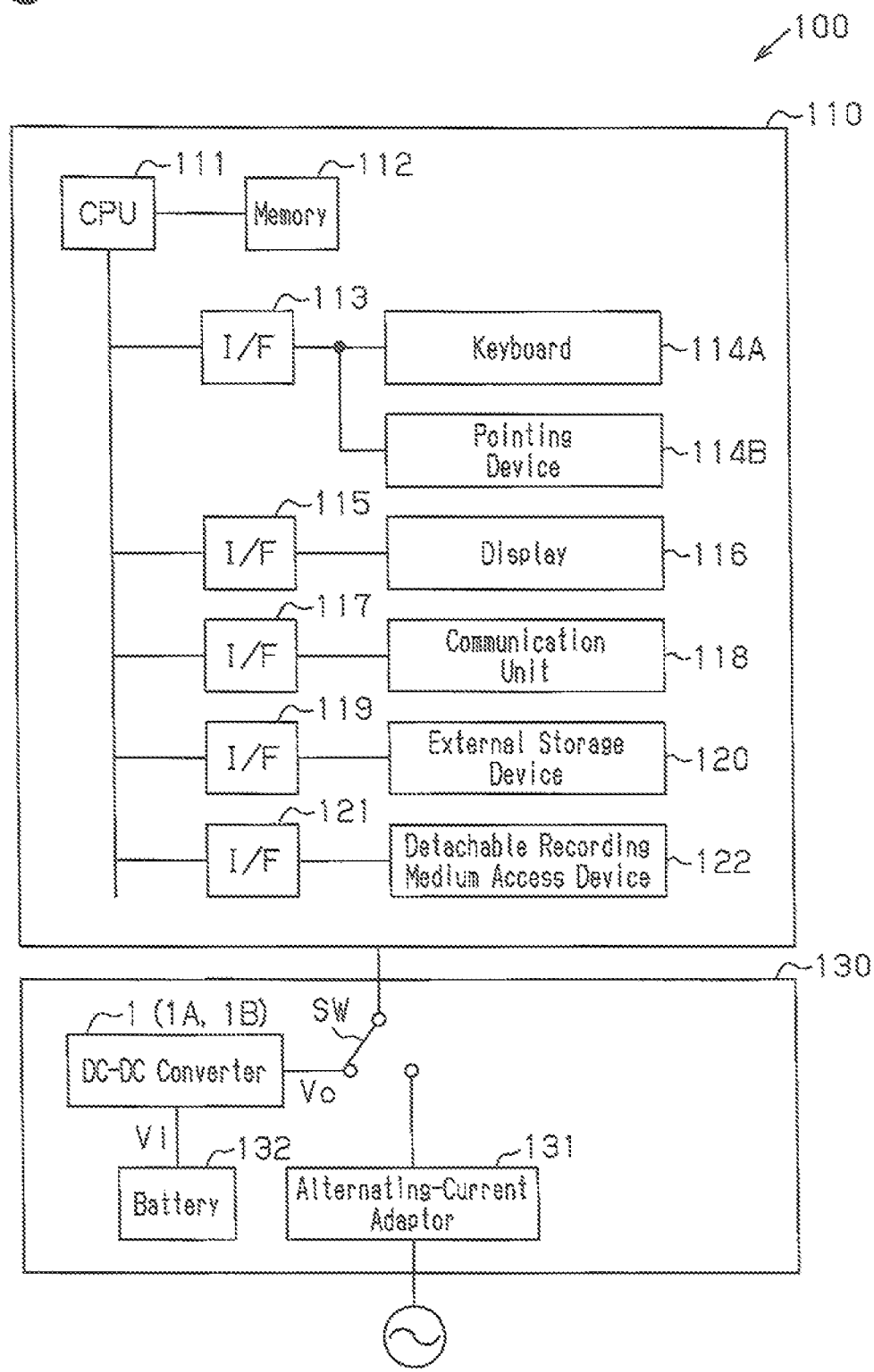
FIG. 13 is a block diagram schematically illustrating a structure of electronic device.
Figure 14:
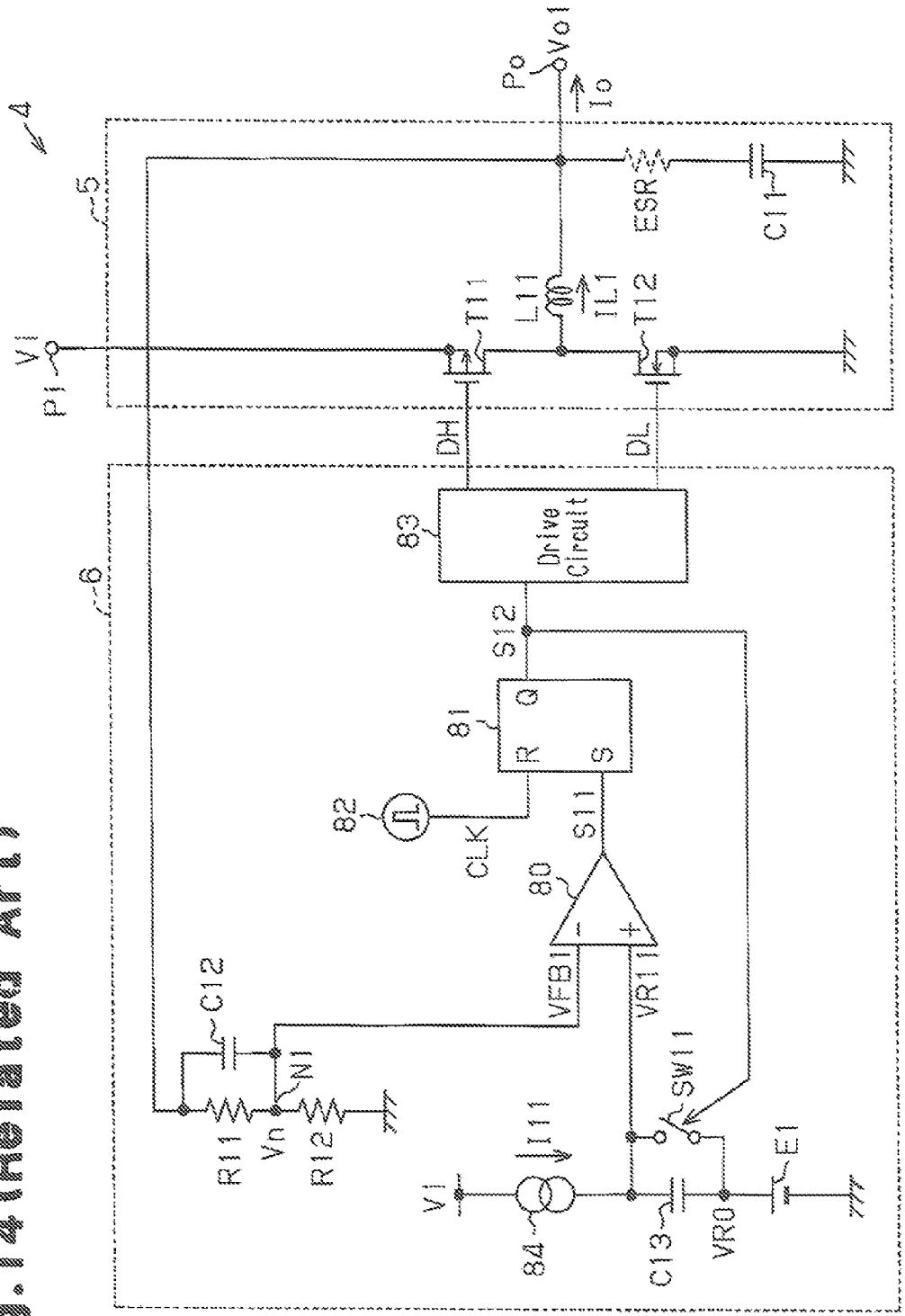
FIG. 14 is, a block circuit diagram schematically illustrating a DC-DC converter of a related art.

FIG. 13 illustrates an example of an electronic device 100 that includes the DC-DC converter 1 (or the DC-DC converter 1A or 1B. The electronic device 100 includes a body unit 110 and a power supply unit 130 that supplies power to the body unit 110.

An example of an internal structure of the body unit 110 will low be described.

A central processing unit (CPU) 111 that executes a program is coupled to a memory 112 which stores the program executed by the CPU 111 and/or data processed by the CPU 111. The CPU 111 is also coupled to a keyboard 114A and a pointing device 114B via an interface (I/F) 113. The pointing device 114B includes a mouse, a trackball, and/or a flat device such as a touch panel, an electrostatic sensor, or the like.

The CPU 111 is coupled to a display 116 via an interface 115, and is also coupled to a communication unit 118 via an interface 117. The display 116 is, for example, a liquid-crystal display, an electroluminescence display, or the like. The communication unit 118 is, for example, a local area network board or the like.

The CPU 111 is coupled to an external storage device 120 is an interface 119, and is also coupled to a detachable recording medium access device 122 via an interface 121. The external storage device 120 is a hard disk, for example. As a detachable recording medium that the access device 122 accesses, there are a CD (Compact Disc), a DVD (Digital Versatile Disk), and a Flash memory card, for example.

An example of an internal structure of the power supply unit 130 will now be described.

The DC-DC converter 1 and an alternating-current adaptor 131 are coupled to the body unit 110 via a switch SW. Power is supplied to the body unit 110 from the DC-DC converter 1 or the alternating-current adaptor 131. In the example of FIG. 13, the DC-DC converter 1 converts an input voltage Vi from a battery 132 into an output voltage Vo, and supplies the output voltage Vo to the body unit 110.

The electronic device 100 includes a laptop personal computer, a communication device such as a portable telephone, an information processing device such as a personal digital assistant (PDA), a video device such as a digital camera and a video camera, and a receiver such as a television device.

All examples and conditional language recited herein are intended for pedagogical purposes to aid the reader in understanding the principles of the invention and the concepts contributed by the inventor to furthering the art, and are to be construed as being without limitation to such recited examples and conditions, nor does the organization of such examples in the specification relate to an illustration of the superiority and inferiority of the invention. Although the embodiment(s) of the present invention(s) has (have) been described in detail, it should be understood that the various changes, substitutions, and alterations could be made hereto without departing from the spirit and scope of the invention.

The invention claimed is:

1. A control circuit of a power supply configured to generate an output voltage from an input voltage, the control circuit comprising:
   a gain adjustment circuit configured to adjust a gain of an alternating-current component of the output voltage;
   an addition circuit configured to add an output signal of the gain adjustment circuit to a first feedback voltage, which is in accordance with the output voltage, to generate a second feedback voltage;
   a voltage generation circuit configured to generate a comparison reference voltage that changes at a given rate with respect to a first reference voltage that is set in accordance with a target value of the output voltage; and
   a switch control circuit configured to control the output voltage by switching a switch circuit, which is supplied the input voltage, at a timing according to a result of a comparison of the second feedback voltage with the comparison reference voltage, wherein:
   the gain adjustment circuit includes:
   a current conversion circuit configured to convert the alternating-current component of the output voltage to a current, and
   a voltage conversion circuit configured to convert an output signal of the current conversion circuit to a voltage;

the current conversion circuit includes:
   a first amplifier circuit including a non-inverting input terminal which is supplied the alternating-current component of the output voltage,
   a first transistor including a gate that receives a signal output from an output terminal of the first amplifier circuit, and
   a first resistor that is coupled to a source of the first transistor and an inverting input terminal of the first amplifier circuit;
   the voltage conversion circuit includes a second resistor that is coupled to an output terminal of the current conversion circuit;
   the addition circuit includes a second amplifier circuit, wherein the second amplifier circuit includes a non-inverting input terminal, which is supplied the first feedback voltage, an inverting input terminal, and an output terminal coupled to the inverting input terminal of the second amplifier circuit via the second resistor; and
   the gain adjustment circuit adjusts the gain of the alternating-current component of the output voltage in accordance with a resistance ratio between the first resistor and the second resistor.

2. The control circuit according to claim 1, wherein:
   the gain adjustment circuit includes an AC coupling circuit that extracts the alternating-current component of the output voltage; and
   the alternating-current component of the output voltage extracted by the AC coupling circuit is supplied to the non-inverting input terminal of the first amplifier circuit.

3. The control circuit according to claim 1, wherein the gain adjustment circuit includes a current mirror circuit that is coupled to a drain of the first transistor.

4. The control circuit according to claim 3, wherein the gain adjustment circuit adjusts the gain in accordance with a mirror ratio of the current mirror circuit.

5. The control circuit according to claim 1, wherein the addition circuit adds, at a node separate from a node at which the first feedback voltage occurs, the output signal of the gain adjustment circuit to the first feedback voltage.

6. A control circuit of a power supply configured to generate an output voltage from an input voltage, the control circuit comprising:
   a gain adjustment circuit configured to adjust a gain of an alternating-current component of the output voltage;
   an addition circuit configured to add an output signal of the gain adjustment circuit to a first reference voltage, which is set in accordance with a target value of the output voltage, to generate a second reference voltage;
   a voltage generation circuit configured to generate a comparison reference voltage that changes at a given rate with respect to the second reference voltage; and
   a switch control circuit configured to control the output voltage by switching a switch circuit, which is supplied the input voltage, at a timing according to a result of a comparison of a first feedback voltage, which is in accordance with the output voltage, with the comparison reference voltage, wherein:
   the gain adjustment circuit includes:
   a current conversion circuit configured to convert the alternating-current component of the output voltage to a current, and
   a voltage conversion circuit configured to convert an output signal of the current conversion circuit to a voltage;
   the current conversion circuit includes:

a first amplifier circuit including a non-inverting input terminal which is supplied the alternating-current component of the output voltage, a first transistor including a gate that receives a signal output from an output terminal of the first amplifier circuit, and a first resistor that is coupled to a source of the first transistor and an inverting input terminal of the first amplifier circuit;

the voltage conversion circuit includes a second resistor that is coupled to an output terminal of the current conversion circuit;

the addition circuit includes a second amplifier circuit, wherein the second amplifier circuit includes a non-inverting input terminal, which is supplied the first reference voltage, an inverting input terminal, and an output terminal coupled to the inverting input terminal of the second amplifier circuit via the second resistor; and the gain adjustment circuit adjusts the gain of the alternating-current component of the output voltage in accordance with a resistance ratio between the first resistor and the second resistor.

7. The control circuit according to claim 6, wherein:
the gain adjustment circuit includes an AC coupling circuit that extracts the alternating-current component of the output voltage; and
the alternating-current component of the output voltage extracted by the AC coupling circuit is supplied to the non-inverting input terminal of the first amplifier circuit.

8. The control circuit according to claim 6, wherein
the gain adjustment circuit includes a current mirror circuit that is coupled to a drain of the first transistor.

9. The control circuit according to claim 8, wherein
the gain adjustment circuit adjusts the gain in accordance with a mirror ratio of the current mirror circuit.

10. The control circuit according to claim 6, wherein
the addition circuit adds, at a node separate from a node at which the first feedback voltage occurs, the output signal of the gain adjustment circuit to the first reference voltage.

11. A power supply device configured to generate an output voltage from an input voltage, the power supply device comprising:
a switch circuit which is supplied the input voltage; and
a control circuit configured to control the switch circuit, wherein the control circuit includes:
  a gain adjustment circuit configured to adjust a gain of an alternating-current component of the output voltage;
  an addition circuit configured to add an output signal of the gain adjustment circuit to a first feedback voltage, which is in accordance with the output voltage, to generate a second feedback voltage;
  a voltage generation circuit configured to generate a comparison reference voltage that changes at a given rate with respect to a first reference voltage that is set in accordance with a target value of the output voltage; and
  a switch control circuit configured to switch the switch circuit at a timing according to a result of a comparison of the second feedback voltage with the comparison reference voltage, wherein:
the gain adjustment circuit includes:
a current conversion circuit configured to convert the alternating-current component of the output voltage to a current, and a voltage conversion circuit configured to convert an output signal of the current conversion circuit to a voltage;

the current conversion circuit includes:
a first amplifier circuit including a non-inverting input terminal which is supplied the alternating-current component of the output voltage, a first transistor including a gate that receives a signal output from an output terminal of the first amplifier circuit, and a first resistor that is coupled to a source of the first transistor and an inverting input terminal of the first amplifier circuit;

the voltage conversion circuit includes a second resistor that is coupled to an output terminal of the current conversion circuit;

the addition circuit includes a second amplifier circuit, wherein the second amplifier circuit includes a non-inverting input terminal, which is supplied with the first feedback voltage, an inverting input terminal, and an output terminal coupled to the inverting input terminal of the second amplifier circuit via the second resistor; and the gain adjustment circuit adjusts the gain of the alternating-current component of the output voltage in accordance with a resistance ratio between the first resistor and the second resistor.

12. A power supply device configured to generate an output voltage from an input voltage, the power supply device comprising:
a switch circuit which is supplied the input voltage; and
a control circuit configured to control the switch circuit, wherein the control circuit includes:
  a gain adjustment circuit configured to adjust a gain of an alternating-current component of the output voltage;
  an addition circuit configured to add an output signal of the gain adjustment circuit to a first reference voltage, which is set in accordance with a target value of the output voltage, to generate a second reference voltage;
  a voltage generation circuit configured to generate a comparison reference voltage that changes at a given rate with respect to the second reference voltage; and
  a switch control circuit configured to switch the switch circuit at a timing according to a result of a comparison of a first feedback voltage, which is in accordance with the output voltage, with the comparison reference voltage, wherein:
the gain adjustment circuit includes:
a current conversion circuit configured to convert the alternating-current component of the output voltage to a current, and a voltage conversion circuit configured to convert an output signal of the current conversion circuit to a voltage;

the current conversion circuit includes:
a first amplifier circuit including a non-inverting input terminal which is supplied the alternating-current component of the output voltage, a first transistor including a gate that receives a signal output from an output terminal of the first amplifier circuit, and a first resistor that is coupled to a source of the first transistor and an inverting input terminal of the first amplifier circuit;

the voltage conversion circuit includes a second resistor that is coupled to an output terminal of the current conversion circuit;

the addition circuit includes a second amplifier circuit, wherein the second amplifier circuit includes a non-inverting input terminal, which is supplied with the first reference voltage, an inverting input terminal, and an output terminal coupled to the inverting input terminal of the second amplifier circuit via the second resistor; and the gain adjustment circuit adjusts the gain of the alternating-current component of the output voltage in accordance with a resistance ratio between the first resistor and the second resistor.

13. A method of controlling a power supply configured to generate an output voltage from an input voltage, the method comprising:

adjusting, by a gain adjustment circuit, a gain of an alternating-current component of the output voltage to generate a gain-adjusted signal;

adding the gain-adjusted signal to a first feedback voltage according to the output voltage to generate a second feedback voltage;

generating a comparison reference voltage that changes at a given rate with respect to a first reference voltage that is set in accordance with a target value of the output voltage; and controlling the output voltage by switching a switch circuit, which is supplied the input voltage, at a timing according to a result of a comparison of the second feedback voltage with the comparison reference voltage, wherein:

the gain adjustment circuit includes:

a current conversion circuit configured to convert the alternating-current component of the output voltage to a current, and a voltage conversion circuit configured to convert an output signal of the current conversion circuit to a voltage;

the current conversion circuit includes:

a first amplifier circuit including a non-inverting input terminal which is supplied the alternating-current component of the output voltage, a first transistor including a gate that receives a signal output from an output terminal of the first amplifier circuit, and a first resistor that is coupled to a source of the first transistor and an inverting input terminal of the first amplifier circuit;

the voltage conversion circuit includes a second resistor that is coupled to an output terminal of the current conversion circuit;

the addition circuit includes a second amplifier circuit, wherein the second amplifier circuit includes a non-inverting input terminal, which is supplied the first feedback voltage, an inverting input terminal, and an output terminal coupled to the inverting input temiinal of the second amplifier circuit via the second resistor; and the gain adjustment circuit adjusts the gain of the alternating-current component of the output voltage in accordance with a resistance ratio between the first resistor and the second resistor.

14. A method of controlling a power supply configured to generate an output voltage from an input voltage, the method comprising:

adjusting a gain of an alternating-current component of the output voltage to generate a gain-adjusted signal;

adding the gain-adjusted signal to a first reference voltage, which is set in accordance with a target value of the output voltage, to generate a second reference voltage;

generating a comparison reference voltage that changes at a given rate with respect to the second reference voltage; and controlling the output voltage by switching a switch circuit, which is supplied the input voltage, at a timing according to a result of a comparison of a first feedback voltage, which is in accordance with the output voltage, with the comparison reference voltage, wherein:

the gain adjustment circuit includes:

a current conversion circuit configured to convert the alternating-current component of the output voltage to a current, and a voltage conversion circuit configured to convert an output signal of the current conversion circuit to a voltage;

the current conversion circuit includes:

a first amplifier circuit including a non-inverting input terminal which is supplied the alternating-current component of the output voltage, a first transistor including a gate that receives a signal output from an output terminal of the first amplifier circuit, and a first resistor that is coupled to a source of the first transistor and an inverting input terminal of the first amplifier circuit;

the voltage conversion circuit includes a second resistor that is coupled to an output terminal of the current conversion circuit;

the addition circuit includes a second amplifier circuit, wherein the second amplifier circuit includes a non-inverting input terminal, which is supplied with the first reference voltage, an inverting input terminal, and an output terminal coupled to the inverting input terminal of the second amplifier circuit via the second resistor; and the gain adjustment circuit adjusts the gain of the alternating-current component of the output voltage in accordance with a resistance ratio between the first resistor and the second resistor.

15. A control circuit of a power supply configured to generate an output voltage from an input voltage supplied to a switch circuit, the control circuit comprising:

a gain adjustment circuit configured to adjust a gain of an alternating-current component of the output voltage and differentially outputs a first output signal and a second output signal;

a first addition circuit configured to add the first output signal to a first feedback voltage, which is in accordance with the output voltage, to generate a second feedback voltage;

a second addition circuit configured to add the second output signal to a first reference voltage, which is set in accordance with a target value of the output voltage, to generate a second reference voltage;

a voltage generation circuit configured to generate a comparison reference voltage that changes at a given rate with respect to the second reference voltage; and a switch control circuit configured to switch the switch circuit at a timing according to a result of a comparison of the second feedback voltage with the comparison reference voltage.

* * * * *